(12) United States Patent
Antonelli et al.

(10) Patent No.: US 11,668,644 B2
(45) Date of Patent: Jun. 6, 2023

(54) OPTO-ACOUSTIC MEASUREMENT OF A TRANSPARENT FILM STACK

(71) Applicant: Onto Innovation Inc., Wilmington, MA (US)

(72) Inventors: George Andrew Antonelli, Portland, OR (US); Manjusha S. Mehendale, Morristown, NJ (US); Robin Mair, West Chicago, IL (US); Nicholas James Keller, La Jolla, CA (US)

(73) Assignee: Onto Innovation Inc., Wilmington, MA (US)

( * ) Notice: Subject to any disclaimer, the term of this patent is extended or adjusted under 35 U.S.C. 154(b) by 145 days.

(21) Appl. No.: 17/217,990

(22) Filed: Mar. 30, 2021

(65) Prior Publication Data
US 2022/0317025 A1    Oct. 6, 2022

(51) Int. Cl.
  *G01N 21/17*   (2006.01)
  *G01B 11/06*   (2006.01)
  *G01B 11/22*   (2006.01)

(52) U.S. Cl.
  CPC ......... *G01N 21/1702* (2013.01); *G01B 11/06* (2013.01); *G01B 11/22* (2013.01); *G01N 2021/1706* (2013.01)

(58) Field of Classification Search
  CPC . G01B 11/06; G01B 11/22; G01N 2021/1706
    (Continued)

(56) References Cited

U.S. PATENT DOCUMENTS 4,710,030 A   12/1987   Tauc et al.
6,552,803 B1 *  4/2003   Wang .................. G01B 17/025
                                          356/502
(Continued)

FOREIGN PATENT DOCUMENTS

JP          5346309 A      12/1993

OTHER PUBLICATIONS

Babilotte, Philippe, "A Basic Complete Numerical Toolbox for Picosecond Ultrasonics," Acoustics 2019, www.mdpi.com/journal/acoustics, Published Jan. 17, 2019, pp. 137 to 155.
(Continued)

*Primary Examiner* — Tarifur R Chowdhury
*Assistant Examiner* — Omar H Nixon
(74) *Attorney, Agent, or Firm* — Paradice & Li LLP

(57) ABSTRACT

A non-destructive opto-acoustic metrology device detects the presence and location of non-uniformities in a film stack that includes a large number, e.g., 50 or more, transparent layers. A transducer layer at the bottom of the film stack produces an acoustic wave in response to an excitation beam. A probe beam is reflected from the layer interfaces of the film stack and the acoustic wave to produce an interference signal that encodes data in a time domain from destructive and constructive interference as the acoustic wave propagates upward in the film stack. The data may be analyzed across the time domain to determine the presence and location of one or more non-uniformities in the film stack. An acoustic metrology target may be produced with a transducer layer configured to generate an acoustic wave with a desired acoustic profile based on characteristics of the film stack.

20 Claims, 14 Drawing Sheets

(58) Field of Classification Search
USPC .................................................. 356/503
See application file for complete search history.

(56) References Cited

U.S. PATENT DOCUMENTS

| | | |
|---|---|---|
| 7,019,845 B1 | 3/2006 | Leary et al. |
| 7,050,178 B2 | 5/2006 | Morath et al. |
| 7,387,027 B2 | 6/2008 | Choi et al. |
| 7,852,488 B2 | 12/2010 | Devos et al. |
| 8,537,363 B2 | 9/2013 | Maris |
| 8,567,253 B2 | 10/2013 | Maris et al. |
| 9,041,931 B2 | 5/2015 | Colgan et al. |
| 9,140,601 B2 | 9/2015 | Mehendale et al. |
| 9,576,862 B2 | 2/2017 | Murray et al. |
| 9,991,176 B2 | 6/2018 | Mehendale et al. |
| 10,241,058 B2 | 3/2019 | Maznev et al. |
| 10,578,555 B2 | 3/2020 | Audoin et al. |
| 2006/0227342 A1 | 10/2006 | Wolf |
| 2006/0272418 A1* | 12/2006 | Maris ............... G01S 15/8965 |
| | | 430/5 |
| 2017/0205377 A1 | 7/2017 | Garnett et al. |
| 2017/0221778 A1* | 8/2017 | Mehendale ........ G01N 29/2418 |

OTHER PUBLICATIONS

Emery, Patrick, "Picosecond Ultrasonics: a Technique Destines for BAW Technology," 1$^{st}$ International Symposium on Laser Ultrasonics: Science, Technology and Applications, Jul. 16-18, 2008, Montreal Canada.

Zizka, Jonathan D., "Mechanical Properties of Low-and High-k DielectricThin Films by Brillouin Light Scattering," Dissertation, The Ohio State University 2016, 144 pages.

Matsuda, O., "Reflection and Transmission of Light in Multilayers Perturbed by Picosecond Strain Pulse Propagation," Journal of the Optical Society of America B: Optical Physics, 19(12): 3028-3041, Dec. 12, 2002, http:hdl.handle.net/2115/44497.

Beresna, Martynas, "Picosecond Reflectance Recovery Dynamics of Porous Silicon Multilayer," Journal of the Optical Society of America B, Feb. 2009.

* cited by examiner

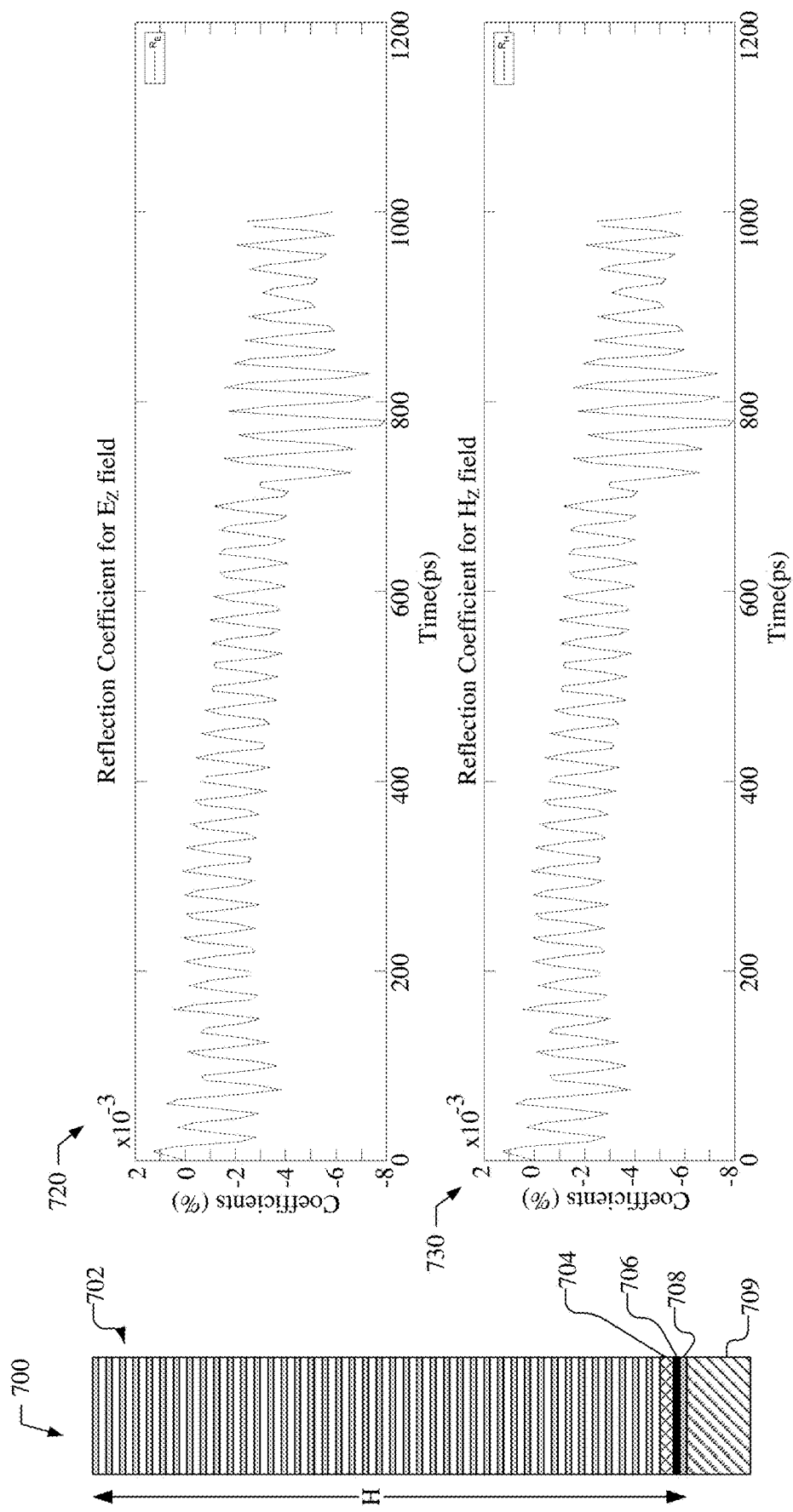

1800 ↘

Select a configuration of a transducer layer at a bottom of the film stack comprising a plurality film layers that are at least partially transparent to an excitation beam and a probe beam from an acoustic metrology device, wherein the transducer layer is configured to be opaque to the excitation beam and to produce an acoustic wave that propagates through the film stack in response to the excitation beam, wherein the configuration of the transducer layer is selected to generate an acoustic profile that is based on characteristics of the film stack ⟋—1802

Select a configuration of at least one layer above or below the transducer layer, wherein the at least one layer is configured to reduce acoustic ringing in the transducer layer ⟋—1804

Fig. 18

OPTO-ACOUSTIC MEASUREMENT OF A TRANSPARENT FILM STACK

FIELD OF THE DISCLOSURE

Embodiments of the subject matter described herein are related generally to non-destructive measurement of a film stack in a sample, and more particularly to the use of an opto-acoustic measurement of a film stack in a sample.

BACKGROUND

Semiconductor and other similar industries often use optical metrology equipment to provide non-contact evaluation of substrates during processing. With optical metrology, a sample under test is illuminated with light, e.g., at a single wavelength or multiple wavelengths. After interacting with the sample, the resulting light is detected and analyzed to determine a desired characteristic of the sample.

One type of sample that is particularly difficult to measure optically is a device with many stacked layers, sometimes referred to as a film stack. For example, 3D memory technologies, such as vertical NAND flash, rely on the stacking of multiple layers of memory cells. The number of layers scales directly with the amount of memory. Accordingly, manufacturers are increasing the number of layers in order to increase memory. The increase in layers occurs while the channel size remains roughly the same leading to an increasing aspect ratio of these devices. By way of example, with 64 layers in a device structure, current metrology systems struggle to obtain information from various locations in the structure during the process flow. As devices scale above 64 layers to, e.g., 96 layers or more, the metrology problem intensifies. Accordingly, non-contact, non-destructive metrology solutions are desirable.

SUMMARY

The presence and location of non-uniformities in a film stack with a large number of transparent layers may be detected non-destructively using an opto-acoustic metrology device, such as a picosecond ultrasonic metrology device. An excitation beam that is incident on a transducer layer at the bottom of the film stack generates an acoustic wave that propagates upward through the film stack. A probe beam is partially reflected from the layer interfaces of the film stack as well as the acoustic wave as the acoustic wave propagates through the film stack. The reflected probe beam produces an interference signal that oscillates due to destructive and constructive interference as the acoustic wave propagates through the film stack to encode data in a time domain, which is equivalent to vertical position in the film stack. The data may be analyzed across the time domain to determine the presence and location of one or more non-uniformities in the film stack. For example, a sliding window Fourier transform is applied to the data across the time domain to generate a frequency and amplitude spectrum with respect to time. Changes in the frequency and amplitude spectrum over time may be used to identify the presence of one or more non-uniformities, as well as the vertical position of the one or more non-uniformities in the film stack. An acoustic metrology target may be produced for a film stack that includes a transducer layer at the bottom that is configured to generate an acoustic wave in response to an excitation beam that has a desired acoustic profile based on characteristics of the film stack and wavelengths of the excitation beam.

In one implementation, a method of non-destructive acoustic metrology of a film stack on a sample may include directing an excitation beam at the film stack. The film stack may include a large number of layers, e.g., at least 50 layers that are at least partially transparent to the excitation beam, and that includes a transducer layer at a bottom of the film stack. The transducer layer produces an acoustic wave in response to the excitation beam and the acoustic wave propagates upward through the film stack. A probe beam may be directed at the film stack, wherein the layers in the film stack are at least partially transparent to the probe beam. The probe beam partially reflects off layer interfaces of the film stack and partially reflects off the acoustic wave. An interference signal is detected from the probe beam reflected from the layer interfaces and the acoustic wave. The interference signal encodes data in a time domain from destructive and constructive interference as the acoustic wave propagates upward in the film stack. A sliding window Fourier transform is applied to the data across the time domain to generate a frequency and amplitude spectrum with respect to time. A presence of one or more non-uniformities in the film stack may be determined based on a change over time in the frequency and amplitude spectrum.

In one implementation, a metrology device for non-destructive acoustic metrology of a film stack on a sample, may include an excitation beam source configured to generate an excitation beam directed at the film stack, where the film stack includes, e.g., more than 50 layers that are at least partially transparent to the excitation beam, and a transducer layer at a bottom of the film stack. The transducer layer produces an acoustic wave in response to the excitation beam and the acoustic wave propagates upward through the film stack. A probe beam source is configured to generate a probe beam directed at the film stack, wherein the layers in the film stack are at least partially transparent to the probe beam. The probe beam partially reflects off layer interfaces of the film stack and partially reflects off the acoustic wave. An optical sensor is configured detect an interference signal from the probe beam reflected from the layer interfaces and the acoustic wave. The interference signal encodes data in a time domain from destructive and constructive interference as the acoustic wave propagates upward in the film stack. At least one processor is coupled to receive the interference signal from the optical sensor and is configured to apply a sliding window Fourier transform to the data across the time domain to generate a frequency and amplitude spectrum with respect to time. The at least one processor is further configured to determine a presence of one or more non-uniformities in the film stack based on a change over time in the frequency and amplitude spectrum.

In one implementation, a wafer includes an acoustic metrology target for a film stack. The acoustic metrology target includes a film stack that includes a plurality of film layers that are at least partially transparent to an excitation beam and a probe beam from an acoustic metrology device. The acoustic metrology target further includes a transducer layer at a bottom of the film stack. The transducer layer is configured to be opaque to the excitation beam and to produce an acoustic wave that propagates through the film stack in response to the excitation beam. The transducer layer is configured to generate an acoustic profile based on characteristics of the film stack.

BRIEF DESCRIPTION OF THE DRAWINGS

FIG. 7A illustrates a more complex model of a film stack and FIG. 7B illustrates a graph of simulated reflection coefficients for the electric ($E_z$) field produced by the film stack of FIG. 7A with transverse electric (TE) pump and probe beams and a graph of simulated reflection coefficients for the magnetic ($H_z$) field produced by the film stack of FIG. 7A with TE pump beam and transverse magnetic (TM) probe beam.

FIG. 18 is a flow chart illustrating a method of generating an acoustic metrology target for a film stack on a sample.

DETAILED DESCRIPTION

Figure 1:
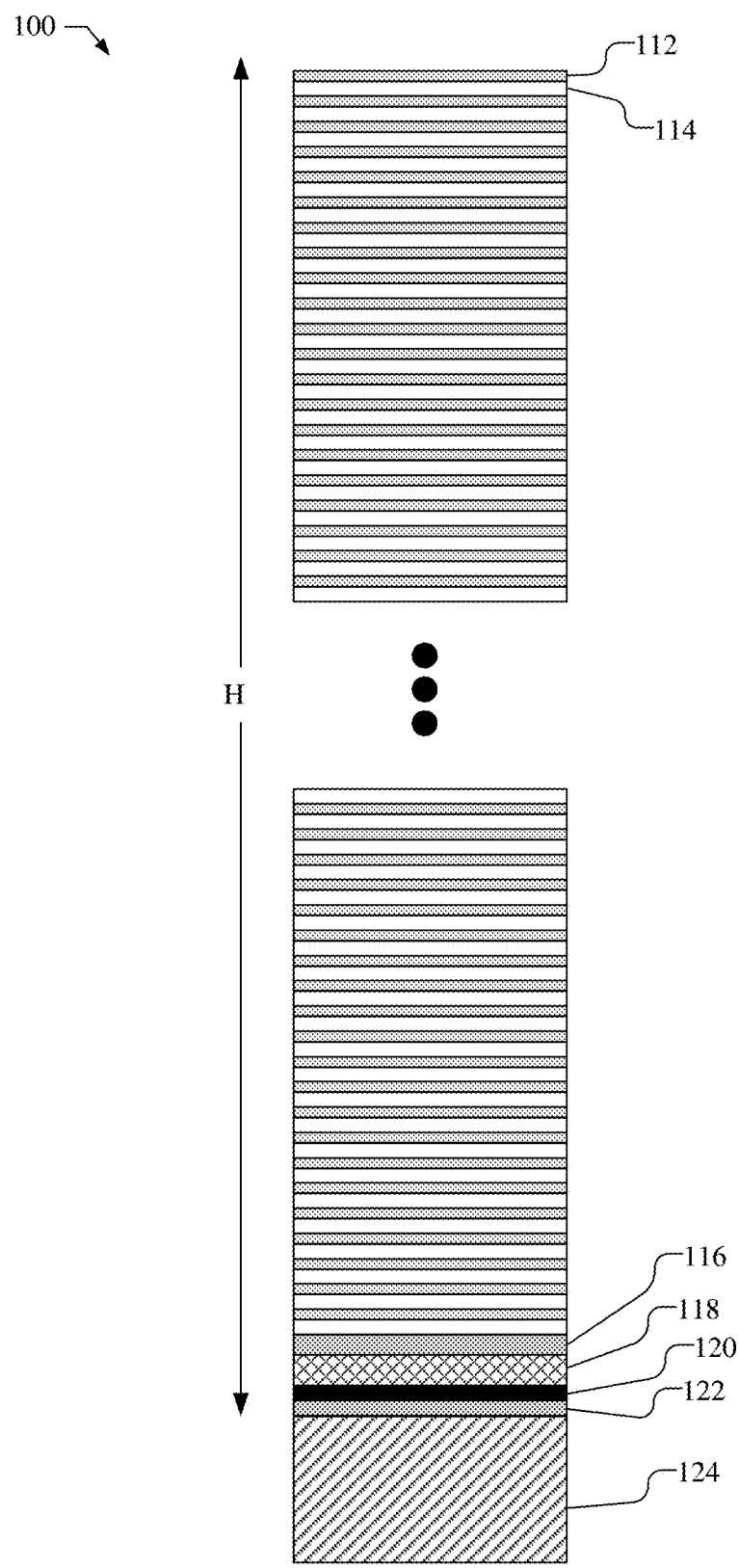
FIG. 1 illustrate a side view of a film stack including a large number of transparent layers and a metal layer at the base of the film stack that may server as an acoustic transducer layer.

During fabrication of semiconductor and similar devices it is sometimes necessary to monitor the fabrication process by non-destructively measuring the devices. Optical metrology is sometimes employed for non-contact evaluation of samples during processing. One type of sample that is particularly difficult to measure optically is a device with a large number of stacked transparent layers. For example, 3D memory technologies, such as vertical NAND flash, produce devices having more than 50 layers, such as 64, 96, or more than 100 layers. Current metrology systems struggle to obtain information from the top to the bottom of devices having many layers, e.g., 64 layers. As devices scale above 64 layers to, e.g., 96 layers or more, the metrology problems intensify and some measurements will not be possible using conventional optical metrology.

Dielectric films are known to vary spatially within the plane of a wafer both in thickness and material properties including but not limited to dielectric constant, electrical leakage, elastic modulus, density, thermal conductivity, etc., due to variations in local composition and structure induced by the variation in deposition parameters including but not limited to temperature, mass transfer, plasma density, etc. Thick film stacks, herein defined as greater than 2 µm, including but not limited to film stacks found within 3D NAND manufacture, as well as far back-end-of-line interconnects in logic devices, may also be subject to unintended variations along the growth axis. Depth dependent variations of material properties may affect downstream processes including but not limited to etch, lithography, etc., leading to undesirable process variations along the growth axis impacting device performance or yield in the final product.

A variation in the optical properties associated with changes in the material properties in a film stack that varies with depth is difficult to measure using conventional optical metrology techniques because such variations produce changes to the complex refractive index that would be very small, e.g., on the order of 1 E-5 or smaller. Consequently, measurement of such variations in the film stack with state-of-the-art reflectometry and ellipsometry hardware, which sample the entire structure nearly simultaneously, would be very difficult. Further, there are currently no high-volume manufacturing (HVM) compatible methods available for a depth resolved elastic modulus measurement of thick dielectric stacks.

As described herein, an opto-acoustic metrology technique, such as picosecond ultrasonics, may be used for depth resolved measurement of a film stack that includes multiple, e.g., more than 50, transparent or semitransparent layers. The depth resolved measurement may be used to detect non-uniformities in the film stack, such as variations in layer thickness, or local mechanical properties, such as density or elastic moduli, and the location of the non-uniformities within the film stack. Picosecond ultrasonics use an excitation beam that induces an acoustic wave to propagate through the film stack. A probe beam is reflected from the layer interfaces of the film stack, which includes the interface between the top surface of the top layer and the ambient environment and underlying interfaces between layers in the film stack. The reflection of the probe beam from all layer interfaces, e.g., the top surface and underlying layer interfaces within the film stack, may be sometimes referred to herein as the net reflection or net spectral reflection. The probe beam will additionally reflect from the acoustic wave as the acoustic wave propagates through the film stack. The layer interfaces of the film stack are static, i.e., are fixed in place, while the acoustic wave acts as a moving interface. The reflection of the probe beam from the acoustic wave will interfere with the net reflection of the probe beam from the layer interfaces, generating an interference pattern. The interference pattern produced by the reflections from the layer interfaces and the acoustic wave will oscillate as the acoustic wave propagates through the film stack. The resulting interference pattern encodes elastic modulus information with respect to vertical positions of the film stack in the time domain. The resulting interference signal may be analyzed to determine characteristics of the film stack. For example, a sliding window Fourier transform may be applied to the resulting data across the time domain to generate a frequency and amplitude spectrum with respect to time, which is equivalent to vertical position in the film stack. The frequency and amplitude spectrum may be analyzed, e.g., by determining changes over time in amplitude and/or frequency, or speed of sound modulus, or elastic modulus, to determine characteristics of the film stack, such as the presence and location of non-uniformities in the film stack.

In some implementations, an acoustic metrology target may be used for a film stack. The acoustic metrology target, for example, may be designed based on characteristics of the film stack to produce a good acoustic response to an acoustic metrology device. For example, the acoustic metrology target may include a film stack with a plurality of film layers that are at least partially transparent to an excitation beam and a probe beam from the acoustic metrology device. The film stack and constituent film layers, for example, are produced along with the film stack and thus, have the same physical characteristics, e.g., materials and dimensions. The acoustic metrology target further includes a transducer layer at the bottom of the film stack, that is configured to be opaque to the excitation beam and to produce an acoustic wave that propagates through the film stack in response to the excitation beam. The transducer layer is configured to generate an acoustic profile based on characteristics of the film stack. For example, the materials and/or thickness of the transducer layer may be selected to be opaque to the excitation beam and to produce the desired acoustic wave. Additionally, or alternatively, the transducer layer may be configured as a non-uniform array of vias, which may generate the desired acoustic response. The transducer layer, for example, may be configured to match an acoustic impedance of a layer in the film stack in which the transducer layer is in contact to reducing ringing of the transducer layer, or to produce ringing with a period that is resonant with a characteristic period of the film stack. Moreover, the transducer layer may be configured using layers above and/or below the transducer layer that are configured to reduce acoustic ringing in the transducer layer.

FIG. 1 illustrates side view of an example of a film stack 100, such as may be found in a 3D-NAND device structure during fabrication. Film stack 100 includes a number of alternating layers of silicon dioxide ($SiO_2$) 112 and silicon nitride ($Si_3N_4$) 114. Each bilayer of silicon dioxide layer 112 and silicon nitride layer 114 may be referred to as a film stack pair, and the full film stack 100 may include a large number of layers, e.g., 50 layers or more. By way of example, the silicon dioxide layer 112 may be 30 nm thick and the silicon nitride layer 114 may be 20 nm thick. At the base of the film stack 100 are relatively thick layers including, e.g., silicon dioxide layer 116 (0.1 µm), doped polysilicon layer 118 (0.3 µm), tungsten silicon (W—Si) layer 120 (0.1 µm), silicon dioxide layer 122 (0.1 µm), and silicon substrate 124. The film stack 100 including the base layers, for example, may have a height (H) of 5 µm. The thicknesses and composition of the film stack 100 is provided for illustration and may vary considerably.

As discussed above, the film stack 100 may include depth dependent variations of material properties such as composition and structure, e.g., in the silicon dioxide and silicon nitride layers 112, 114. These variations may affect downstream processes including but not limited to etch, lithography, etc., leading to undesirable process variations along the growth axis impacting device performance or yield in the final product. Variations in the optical properties that are associated with changes in the material properties in the film stack 100 will result in only very small changes in the complex refractive index, which will make measurement using conventional optical metrology devices, such as reflectometry and ellipsometry, difficult. Moreover, the dielectric layers, e.g., silicon dioxide and silicon nitride layers 112, 114 are optically transparent and a conventional optical metrology device, such as reflectometry and ellipsometry, will sample the entire structure nearly simultaneously. Accordingly, measuring depth dependent variations in a film stack with a conventional optical metrology device is not practical.

In one implementation, an opto-acoustic metrology device, such as a picosecond ultrasonic device, may be used to measure non-uniformities in film stacks that have a large number of layers, such as film stack 100, and provide depth resolved measurement of the non-uniformities. The opto-acoustic metrology device, for example, uses pump and probe laser pulses that are both able to reach the bottom of the film stack 100. Beneath the dielectric stack, a transducer layer, such as a metal layer, absorbs pump pulse energy and launches a sound wave vertically into the dielectric stack. For example, referring to film stack 100, the tungsten layer 120 may function as the transducer layer. The multiple interfaces of the alternating layers in the film stack 100 do not hinder the vertical propagation of the sound wave towards the top surface of the film stack 100.

The propagating sound wave interacts with the probe beam via piezo-reflectance response, resulting in a characteristic oscillatory time-evolved signal, i.e., coherent Brillouin scattering. The period of oscillation reveals information regarding speed of sound and elastic modulus within the film stack 100. The total stack thickness is large in comparison to the acoustic transit distance comprising a single period of oscillation. In other words, there will be many oscillations produced as the sound wave propagates vertically through the entire height of the film stack. A small fraction of the total oscillations that occur over the total one-way acoustic transit time may be used to determine the oscillation period with suitable precision. Accordingly, an analysis time window may be swept through the entirety of the one-way acoustic time, to yield a depth-resolved oscillation period. The depth-resolved oscillation period may be used to extract the speed of sound and Young's modulus at various depths in the film stack, which may be used to provide insight into the presence and location of non-uniformities in the film stack.

Figure 2:
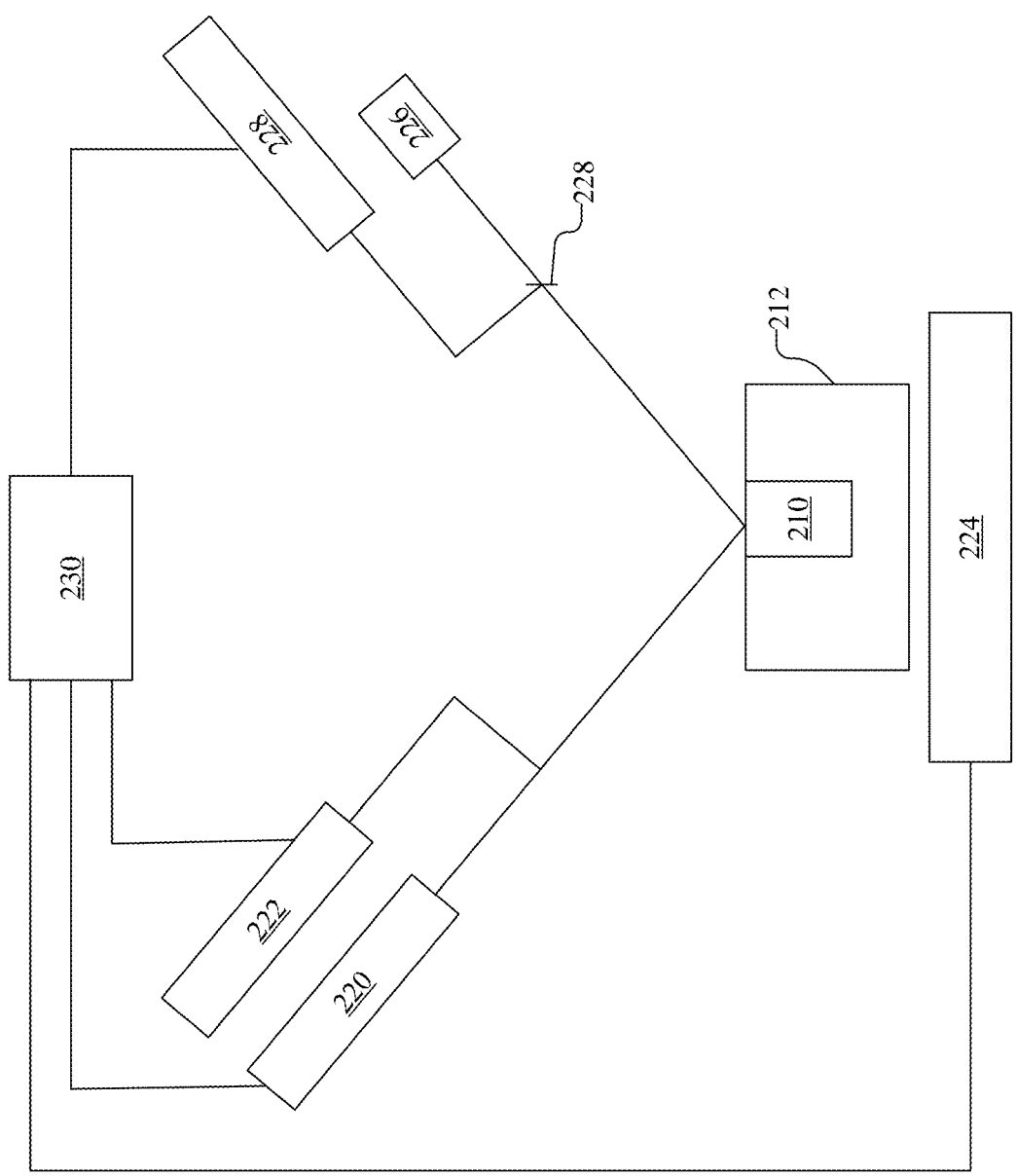
FIG. 2 illustrates a schematic representation of an example opto-acoustic metrology system that may measure a transparent film stack.

FIG. 2 illustrates a schematic representation of an example opto-acoustic metrology system 200 that may measure a transparent film stack as discussed herein. In general this system includes a pump laser 220 (also referred to herein as a excitation laser); a probe laser 222 (also referred to herein as a detection laser); optics including lenses, filters, polarizers and the like (not shown) that direct radiation from the pump and probe lasers 220, 222 to a film stack 210; a mechatronic support 224 for a substrate/sample 212 of which film stack 210 is a part, the mechatronic support 224 being adapted to move the substrate 212 relative to the pump and probe lasers 220, 222; a beam dump 226 for capturing radiation from the pump laser returned from the film stack 210; a sensor 228 adapted to sense an intensity of radiation from the probe laser 222 that is returned from the film stack 210; and, a controller 230 coupled to the probe and pump lasers 220, 222, the mechatronic support 224, and the sensor 228.

It should be appreciated that the controller 230 may be a self-contained or distributed computing device capable of performing necessary computations, receiving, and sending instructions or commands and of receiving, storing, and sending information related to the metrology functions of the system.

In the depicted embodiment the pump and probe lasers 220, 222 in the embodiment of the opto-acoustic metrology system 200 shown in FIG. 2 can share at least a portion of an optical path to and from the film stack 210. For example, the lasers can have a number of different relative arrangements including a configuration wherein the paths are the same, partially overlapping, adjacent, or coaxial. In other embodiments, the pump and probe lasers 220, 222 and the beam dump 226 and sensor 228 do not share optical paths. Preferably, the pump and probe lasers 220, 222 may be controlled directly so as to obtain the necessary temporal spacing between the pulses of light directed to the film stack 210.

It should be appreciated that many optical configurations are possible. In some configurations the pump can be a pulsed laser with a pulse width in the range of several hundred femtoseconds to several hundred nanoseconds and the probe beam is a continuous wave beam coupled to an interferometer or beam deflection system. For example, in systems wherein the probe is pulsed the system can employ a delay stage (not shown) for increasing or decreasing the length of the optical path between the laser and the film stack 210 associated therewith. The delay stage, where provided, would be controlled by controller 230 to obtain the necessary time delays in the light pulses that are incident on the object. Many other alternative configurations are also possible. On other embodiments, the system does not include a delay stage. It should be appreciated that the schematic illustration of FIG. 2 is not intended to be limiting, but rather depict one of a number of example configurations for the purpose of explaining the new features of the present disclosure.

In operation, the opto-acoustic metrology system 200 directs a series of pulses of light from pump laser 220 to the film stack 210. These pulses of light are incident (i.e., at an angle which can be any angle between zero to 90 degrees including, for example, 45 degrees and 90 degrees) upon and at least partially absorbed by a transducer layer in the film stack 210. The absorption of the light by the transducer layer causes a transient expansion in the material of the film stack 210. The expansion is short enough that it induces what is essentially an ultrasonic wave that propagates vertically upwards in the film stack 210 towards the top surface. Light from the pump laser 220 that is reflected from the film stack 210 is passed into a beam dump 226 which extinguishes or absorbs the pump radiation.

In addition to directing the operation of the pump laser 220, the controller 230 directs the operation of the probe laser 222. Probe laser 222 directs radiation in a series of light pulses that is incident on the film stack 210, which reflect from the layer interfaces of the film stack 210 (including the top surface and underlying layer interfaces) and also reflect from the ultrasonic wave as it propagates through the film stack 210. The light reflected from the surface of the film stack 210 and reflected from the ultrasonic wave is directed from the film stack 210 to the sensor 228 by means of beam splitter 229. The reflected light interferes constructively and destructively as the ultrasonic wave propagates producing interference oscillations. The sensor 228 may be adapted to sense a change in the intensity of the probe beam of light caused by the interference oscillations.

The spot sizes of the pump and probe beams may vary based upon the particular application to which the method is put. The spot sizes of the respective beams may be similar or dissimilar. The spot size of the respective beams may, for example, range from around 100 µm to approximately the wavelength diffraction limit of the optical system used to carry out the optical acoustic metrology process, i.e., to less than 1 µm. The spot size of the laser can be in part based upon the size of the structure being measured or upon a balance between signal strength and thermal budget of the sample under test.

Figure 3:
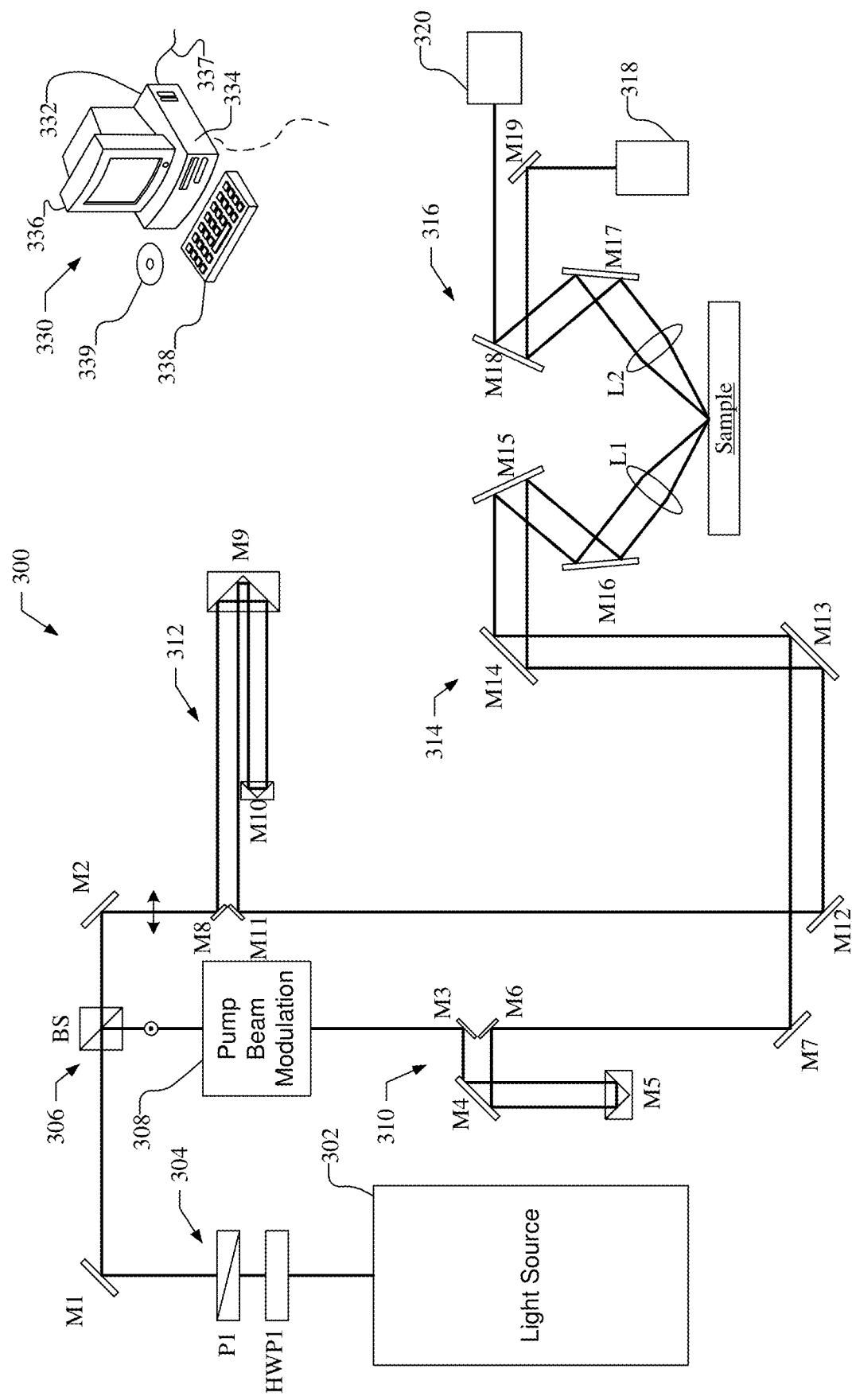
FIG. 3 illustrates a more detailed schematic representation of an example opto-acoustic metrology system that may measure a transparent film stack.

FIG. 3 illustrates a schematic representation of an example opto-acoustic metrology system 300 that may measure a transparent film stack as discussed herein. As illustrated, light may be produced from a light source 302, such as a 520 nm, 200 fs, 600 MHZ laser. The light is directed through an intensity control 304, including a half wave plate HWP1 and a polarizer P1, and directed by mirror M1 to pump probe separator 306, which may include a polarizing beam splitter BS and mirror M2. The pump beam passes through a pump beam modulator 308, e.g., an electro-optic modulator (EOM), and a pump delay 310 that includes mirrors M3, M4, M5, and M6, before being directed to a pump beam steerer, e.g., mirror M7 which is attached to a piezoelectric motor to adjust the position of the mirror M7 and thus the direction of the pump beam. After the pump probe separator 306, the probe beam is directed to a probe variable delay 312 that includes mirrors M8, M9, M10, and M11, where mirror M10 moves to adjust the delay in the probe beam. The probe beam, after the probe variable delay 312 is directed to probe beam steerer 314, e.g., mirror M12, which is attached to a piezoelectric motor to adjust the position of the mirror M12 and thus the direction of the probe beam. The pump and probe beams are directed by mirror M13 to a focusing unit 314, which is illustrated as including mirrors M14, M15, and M16 and lens L1, to the beams on the film stack on the sample. The reflected beams are received by a receiving unit 316, which is illustrated as including lens L2 and mirrors M17 and M18. The receiving unit 316, e.g., directs the reflected pump beam to a beam dump 318 via mirror M19, and directs the reflected probe beam to a detector 320, which performs lock in detection for reflectivity and deflection. The detector 320 may include, e.g., a polarization state detector with encoder and detector. In the depicted embodiment, the system may include additional components and subsystems, such as beam management and conditioning components, such as beam expanders, collimators, polarizers, half-wave plates, etc., as well as a beam power detector, and a height detector. Those having skill in the art will appreciate variations of the systems depicted in FIGS. 2 and 3 that would still be suitable to carry out the opto-acoustic metrology techniques described herein.

The detector 320, as well as other components of the opto-acoustic metrology system 300, such as the light source 302, probe variable delay 312, stage/actuator upon which the sample is held may be coupled to at least one processor 330, such as a workstation, a personal computer, central processing unit or other adequate computer system, or multiple systems. It should be understood that one processor, multiple separate processors or multiple linked processors may be used, all of which may interchangeably be referred to herein as processor 330, at least one processor 330, one or more processors 330. The processor 330 is preferably included in, or is connected to, or otherwise associated with opto-acoustic metrology system 300. The processor 330, for example, may control the positioning of the sample, e.g., by controlling movement of a stage on which the sample is held. The stage, for example, may be capable of horizontal motion in either Cartesian (i.e., X and Y) coordinates, or Polar (i.e., R and θ) coordinates or some combination of the two. The stage may also be capable of vertical motion along the Z coordinate. The processor 330 may further control the operation of a chuck on the stage used to hold or release the sample. The processor 330 may also collect and analyze the data obtained from the detector 320. The processor 330 may analyze the data to determine one or more physical characteristics of the sample including the presence of one or more non-uniformities in the film stack, such as variations in layer thickness, or local mechanical properties, such as density or elastic moduli, and in some implementations, the location of one or more non-uniformities in the film stack. For example, the processor 330 may analyze the interference signal produced from the sample using a sliding window Fourier transform and determine the presence of non-uniformities based on the resulting frequency and amplitude spectrum with respect to time, as discussed herein. In some implementations, the processor 330 may further use a model of the film stack under measurement to determine the presence of non-uniformities. For example, the measured data may be obtained and compared to a modeled data. Parameters of the model may be varied, and modeled data compared to the measured data, e.g., in a linear regression process, until a good fit is achieved between the modeled data and the measured data, at which time the modeled parameters are determined to be the characteristics of the film stack under test.

The processor 330, which includes at least one processing unit 332 with memory 334, as well as a user interface including e.g., a display 336 and input devices 338. A non-transitory computer-usable storage medium 339 having computer-readable program code embodied may be used by the processor 330 for causing the at least one processor to control the opto-acoustic metrology system 300 and to perform the functions including the analysis described herein. The data structures and software code for automatically implementing one or more acts described in this detailed description can be implemented by one of ordinary skill in the art in light of the present disclosure and stored, e.g., on a computer-usable storage medium 339, which may be any device or medium that can store code and/or data for use by a computer system such as processing unit 332. The computer-usable storage medium 339 may be, but is not limited to, flash drive, magnetic and optical storage devices such as disk drives, magnetic tape, compact discs, and DVDs (digital versatile discs or digital video discs). A communication port 337 may also be used to receive instructions that are used to program the processor 330 to perform any one or more of the functions described herein and may represent any type of communication connection, such as to the internet or any other computer network. The communication port 337 may further export signals, e.g., with measurement results and/or instructions, to another system, such as external process tools, in a feed forward or feedback process in order to adjust a process parameter associated with a fabrication process step of the samples based on the measurement results. Additionally, the functions described herein may be embodied in whole or in part within the circuitry of an application specific integrated circuit (ASIC) or a programmable logic device (PLD), and the functions may be embodied in a computer understandable descriptor language which may be used to create an ASIC or PLD that operates as herein described. The results from the analysis of the data may be stored, e.g., in memory 334 associated with the sample and/or provided to a user, e.g., via display 336, an alarm or other output device. Moreover, the results from the analysis may be fed back to the process equipment to adjust the appropriate patterning step to compensate for any detected variances in the multiple patterning process.

Figures 4A, 4B:
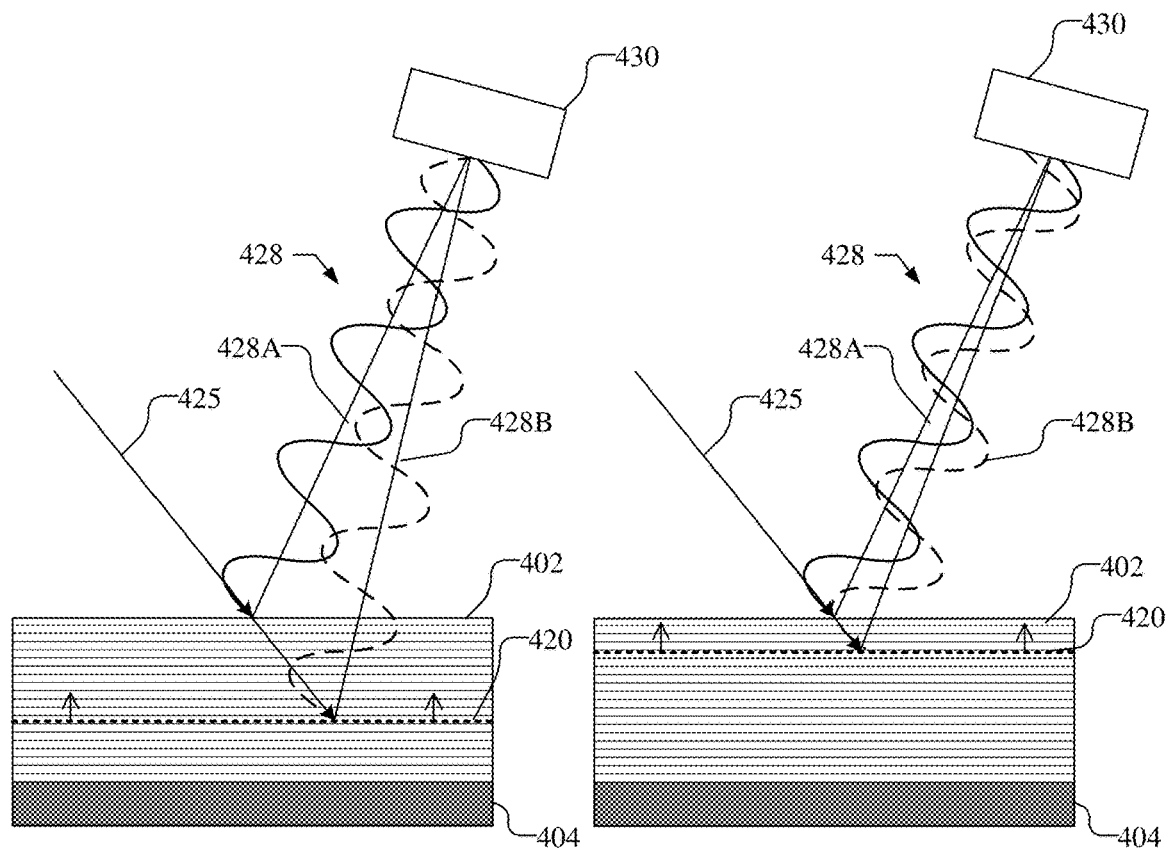
FIGS. 4A and 4B illustrate measurement of at least partially optically transparent dielectric film stack on a transducer layer by an opto-acoustic metrology system.

FIGS. 4A and 4B illustrate measurement of at least partially optically transparent dielectric film stack 402 on a transducer layer 404 by an opto-acoustic metrology system, such as opto-acoustic metrology system 200 or 300. The film stack 402 includes a relatively large number of film layers, e.g., 50, 100, or more layers, which are at least partially transparent to the excitation and probe beams used by the opto-acoustic metrology system. A light pulse (excitation) (not shown) passes through the dielectric film stack 402 and is incident on a transducer layer 404 that generates an acoustic wave, sometimes referred to as sound wave 420, illustrated as a dashed line, that propagates through the dielectric film stack 402 towards the top surface of the dielectric film stack 402. FIGS. 4A and 4B illustrate the sound wave 420 at different times during the propagation towards the top surface of the dielectric film stack 402.

A second light pulse (probe) 425 from the same or a different laser focused onto the same spot, measures the optical reflectivity of the dielectric film stack 402 modified by the sound wave 420, e.g., due to the Brillouin effect. The probe beam 425 may have a wavelength that is greater than a thickness of each layer in the film stack. The probe beam 425 is at least partially reflected from the dielectric film stack 402. The reflected probe beam 428 has two components: one component 428A is the net spectral reflection from the layer interfaces of the dielectric film stack 402, including the top surface of the film stack 402 and underlying layer interfaces within the film stack 402 (which is illustrated as a reflection from only the top surface for the sake of simplicity), and the other component 428B is reflection or backscattering from the sound wave 420 as the sound wave 420 propagates upward through the dielectric film stack 402. As the sound wave 420 propagates upward through the dielectric film stack 402, it causes small local changes in the optical properties which reflect the probe beam 425. These two components 428A and 428B of the reflected probe beam 428 interfere at the detector 430. The detector 430 detects the interference signal over time. The interference signal encodes data in a time domain due to the constructive and destructive interference of the reflected light as the sound wave 420 propagates through the dielectric film stack 402 over time. FIG. 4A shows the case where the reflected probe beam 428 destructively interferes with itself, and FIG. 4B shows the case where the reflected probe beam 428 constructively interferes. The period of the oscillations depends on the wavelength of the probe beam 425, the incident angle of the probe beam 425, the sound velocity in the dielectric film stack 402, and the index of refraction of the dielectric film stack 402. Assuming there are no variations in the dielectric film stack 402, e.g., only a single dielectric film is present, the period of oscillations of the resulting interference signal will be fixed. Where variations in the dielectric film stack 402 are present, such as due to non-uniformities, e.g., variations in layer thicknesses or local mechanical properties, such as density or elastic moduli, the period of oscillations of the resulting interference signal will vary over time corresponding to vertical position of the acoustic wave 420 in the dielectric film stack 402, which may be detected and used to identify non-uniformities as well as location in the dielectric film stack 402 of any non-uniformities.

Figure 5:
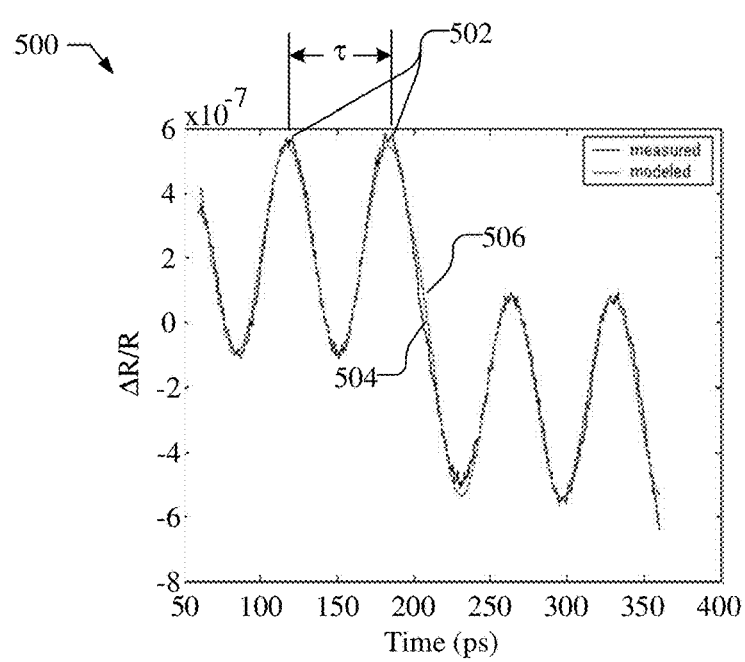
FIG. 5 illustrates a graph showing interference oscillations over time for a thin single dielectric film.

FIG. 5, by way of example, illustrates a graph 500 that shows interference oscillations 502 over time for a relatively thin single dielectric film, e.g., with a thickness of approximately 0.5 μm. The graph 500 illustrates the change in reflectance (ΔR) over the reflectance (R) over time for measured signals 504 and modeled signals 506. The oscillation period t between peaks in oscillations 502 is the key measured parameter.

The period of the oscillations can be used to determine the sound velocity V, in the dielectric film using $$V = \frac{\lambda}{2n\tau\cos\phi} \quad \text{eq. 1}$$

where n is the index of refraction of the dielectric film; τ is the period of the interference oscillations; λ is the wavelength of the probe beam 425; and φ is the angle of refraction.

The elastic stiffness of the dielectric film is described by $c_{11}=\rho v^2$. Young's modulus (Y) of the dielectric film can then be calculated by:

$$Y = \frac{(1-2v)(1+v)}{(1-v)}\square\rho V^2 \quad \text{eq. 2}$$

where ρ is the density, v is Poisson's ratio of the dielectric film stack 402.

The wavelength λ of the probe beam 425 the angle of refraction φ are known parameters, e.g., based on calibration of the opto-acoustic metrology system. The index of refraction n, the density, and Poisson's ratio of the dielectric film may be assumed or measured, e.g., using a reflectometer or ellipsometer. Thus, the speed of sound (or Young's modulus) may be determined from the oscillation period t of the interference oscillation.

Figures 6A, 6B:
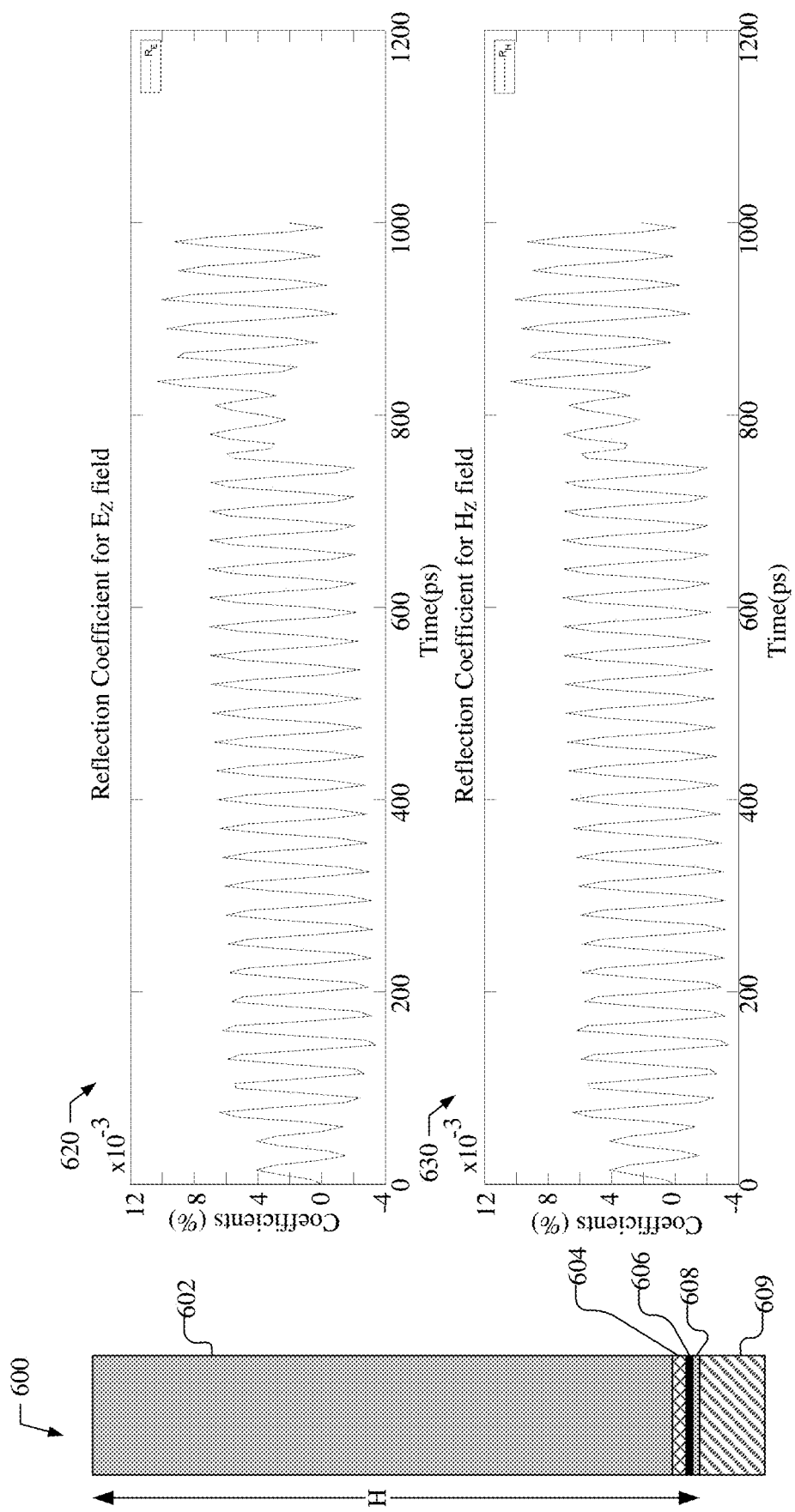
FIG. 6A illustrates a simplified model of a film stack and FIG. 6B illustrates a graph of simulated reflection coefficients for the electric ($E_z$) field produced by the film stack of FIG. 6A with transverse electric (TE) pump and probe beams and a graph of simulated reflection coefficients for the magnetic ($H_z$) field produced by the film stack of FIG. 6A with TE pump beam and transverse magnetic (TM) probe beam.

FIG. 6A illustrates a simplified model of a film stack 600 and FIG. 6B illustrates a graph 620 of simulated reflection coefficients for the electric ($E_Z$) field produced with transverse electric (TE) pump and probe beams and a graph 630 of simulated reflection coefficients for the magnetic ($H_Z$) field produced with TE pump beam and transverse magnetic (TM) probe beam. While a film stack 600 is not a thin dielectric film used to produce the interference oscillations 502 in graph 500, similar to FIG. 5, the reflection coefficients in FIG. 6B represent ΔR/R over time, which is equivalent to vertical position in the film stack 600.

The film stack 600 is similar to film stack 100 shown in FIG. 1, with the film stack pairs modeled as a thick (4.5 µm) silicon dioxide layer 602. The base of the film stack 600 includes a doped polysilicon layer 604 (0.3 µm), tungsten silicon (W—Si) layer 606 (0.1 µm), a silicon dioxide layer 608 (0.1 µm), and silicon substrate 609. The film stack 600 including the base layers a height (H) of 5 µm.

As illustrated in FIG. 6B, the simulated reflections of the film stack 600 produced using an opto-acoustic metrology system includes a plurality of interference oscillations.

FIGS. 7A and 7B are similar to FIGS. 6A and 6B but illustrate a more complex model of a film stack 700 and the resulting simulated reflection coefficients produced using an opto-acoustic metrology system. FIG. 7A, for example, illustrates a model of a film stack 700 that includes 30 nm silicon dioxide and 20 nm silicon nitride layers in each film stack pair 702, and includes a base with a doped polysilicon layer 704 (0.3 µm), W—Si layer 706 (0.1 µm), a silicon dioxide layer 708 (0.1 µm), and silicon substrate 709 and a height (H) of 5 µm. FIG. 7B illustrates a graph 720 of simulated reflection coefficients (ΔR/R over time) for the $E_Z$ field produced with TE pump and probe beams and a graph 730 of simulated reflection coefficients for the $H_Z$ field produced with TE pump beam and TM probe beam.

As illustrated in FIG. 7B, the simulated reflections of the film stack 700 produced using an opto-acoustic metrology system includes a plurality of interference oscillations, which varies over time more than if a single layer is used to model the film stack pairs (e.g., as illustrated in FIG. 6B) due to the penetration of the probe beam through the film stack 700 and the propagation of the acoustic wave upward through the complex film stack 700.

The oscillating signal produced by a film stack may be analyzed, e.g., using a sliding window Fourier transform. The window, for example, may have a fixed width, e.g., greater than 2 interference oscillations and less than 10 interference oscillations, that is swept through the time domain of the resulting signal. At each position along the length of signal, a Fourier transform is performed over the signal fragment. The resulting analysis of the signal includes the time position of the window and the frequency and amplitude spectrum that results from the Fourier transform associated with each time position. The resulting data may be visualized as a periodogram, although it should be understood that the data analysis does not require production of a periodogram.

Figure 8:
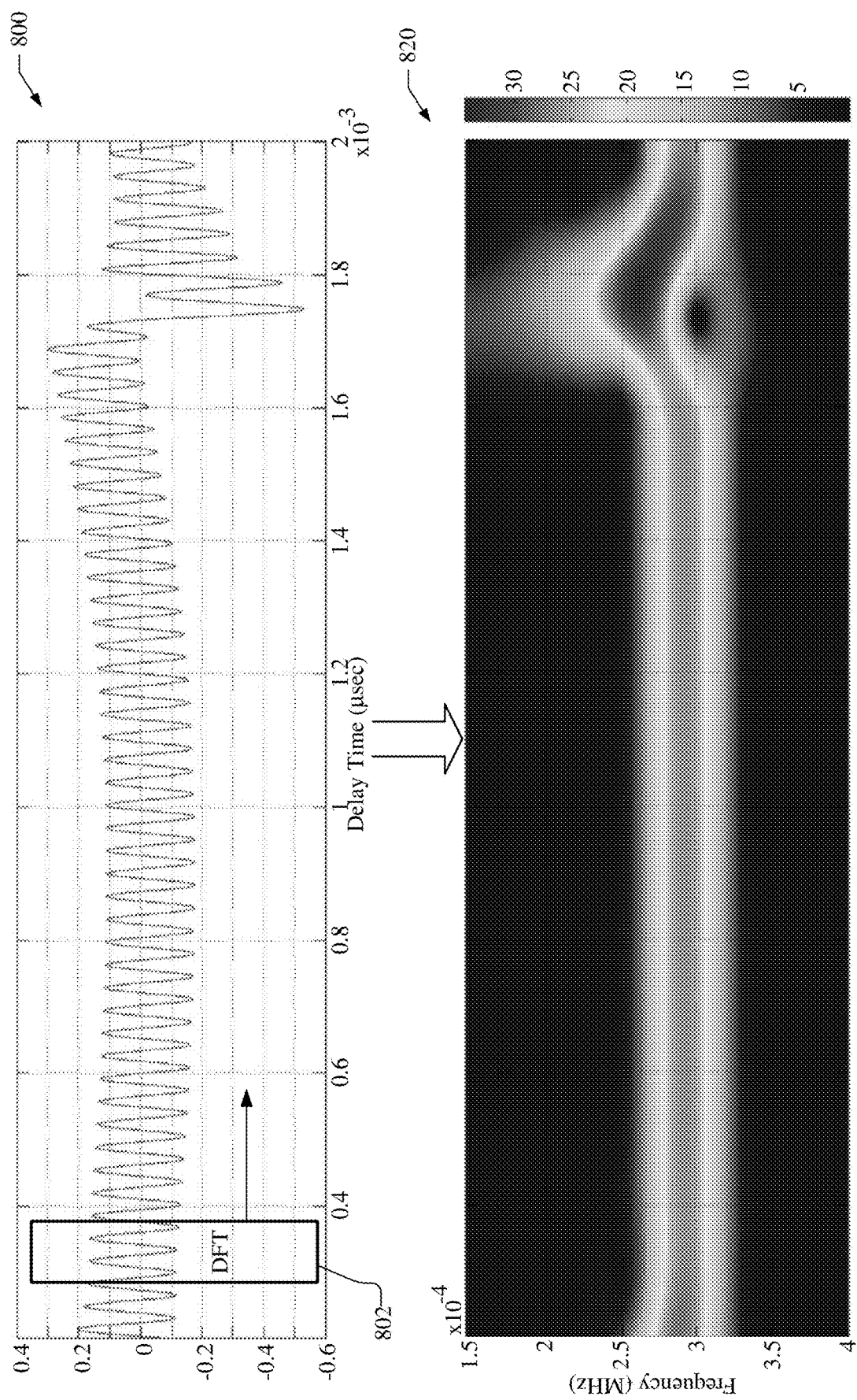
FIG. 8 illustrates a simulated interference signal produced from the opto-acoustic measurement of a film stack and a periodogram produced as a result of a discrete Fourier transform applied to the interference signal using a sliding window.

FIG. 8 illustrates an interference signal 800 produced from a simulation of an opto-acoustic measurement of a film stack and a periodogram 820 produced as a result of a discrete Fourier transform applied to the interference signal 800 using a sliding window 802. While the sliding window 802 appears as a box in FIG. 8, it should be understood that a Hann window or other type of function may be applied as the sliding window. The time (or period) and frequency are conjugate variables of the Fourier transform. The window width is proportional to the frequency resolution, i.e., a wider window increases the frequency resolution. Additionally, the window width is inversely proportional to the time resolution, i.e., a wider window decreases the time resolution. The width of the window may be selected based on the desired frequency and time (or period) resolution. For example, the window width may be chosen according to the characteristic frequency of signal, e.g., a width between 2-10 periods, or more particularly between 3-5 periods of the signal may be selected for a good balance of time and frequency resolution.

The periodogram 820 illustrates the results of the sliding window Fourier transform of the signal 800. The periodogram 820 is a heat map representation of the Fourier amplitude plotted in a graph with the X axis representing time, which is proportional to depth in the film stack, and the Y axis representing Fourier frequency.

Similar to the thin film example of modulus measurement illustrated in FIG. 5, the Fourier frequency (1/period) (along Y axis of the periodogram 820) carries information regarding the speed of sound/elastic modulus of the effective medium. The information is depth resolved (time) (along the X axis of the periodogram 820). The modulation of the constituent layer thicknesses in the film stack may affect the characteristic frequency of the signal.

Based on changes over time in the frequency and amplitude spectrum produced by the sliding window Fourier transform, the presence of one or more non-uniformities in the film stack may be detected. For example, the presence of non-uniformities in the film stack may be determined based on a deviation in frequency or amplitude that varies over time by an amount greater than a predetermined threshold, e.g., based on a known good reference signal or from a model based on intended materials properties and layer thickness.

In another example, the frequency and amplitude spectrum may be converted to a speed of sound modulus, e.g., as illustrated in equation 1, and a non-uniformity may be detected if the speed of sound modulus varies over time by an amount greater than predetermined threshold. The determination of the variation in the speed of sound modulus may be performed with respect to time (illustrated as the X axis of the periodogram) or equivalently with respect to position in the film stack.

In an example, the frequency of the frequency and amplitude spectrum may encode depth resolved elastic modulus of the film stack. The frequency and amplitude spectrum may be converted to a modulus of elasticity (Young's modulus), e.g., as illustrated in equation 2, and a non-uniformity may be detected if the modulus of elasticity varies over time by an amount greater than predetermined threshold.

Additionally, the frequency in the frequency and amplitude spectrum with respect to time may encode information related to a depth resolved constituent layer thickness within the film stack. The presence of non-uniformities in the film stack may be determined by converting the frequency and amplitude spectrum to the layer thickness and determining the layer thickness varies over time by an amount greater than a threshold. For example, two adjacent layers in the film stack may be effectively modeled as a single layer having a combination of dielectric parameters, e.g., as illustrated in FIGS. 6A and 6B. The frequency and amplitude spectrum may be converted to the constituent layer thickness deviation based on departure of the frequency and amplitude spectrum from the effectively modeled frequency and amplitude spectrum.

Further, the location of the non-uniformity in the film stack may be determined based on the frequency and amplitude spectrum with respect to time. For example, the time domain of the interference signal encodes depth information for the film stack. The presence of non-uniformities in the film stack may be determined based on a change over time in the frequency and amplitude spectrum, while the location of the non-uniformity is determined based on the time corresponding to the change over time in the frequency and amplitude spectrum. For example, the time domain of the frequency and amplitude spectrum may be converted to the depth in the film stack based on a determined speed of sound modulus from the interference signal.

In some implementations, a model for one or more characteristics of the film stack may be generated, where a frequency and amplitude spectrum over time may be modeled. One or more non-uniformities in the film stack may be determined using the model, e.g., by comparing the measured frequency and amplitude spectrum over time to the modeled frequency and amplitude spectrum over time, and adjusting one or more parameters in the model, e.g., in a linear regression process, until a good fit is achieved between the predicted data and the measured data, at which time the modeled parameters are determined to be the one or more characteristic of the film stack. Due to the time-evolved nature of the signal, the process of optimizing a model of the film stack with respect to a measured frequency and amplitude spectrum may be sequenced according to depth within the film stack. The model may be optimized, for example, over specific regions, largely independently of other regions separated by depth (z), to find the one or more parameters of the specific regions that produce a good fit with the measured data.

Figure 9:
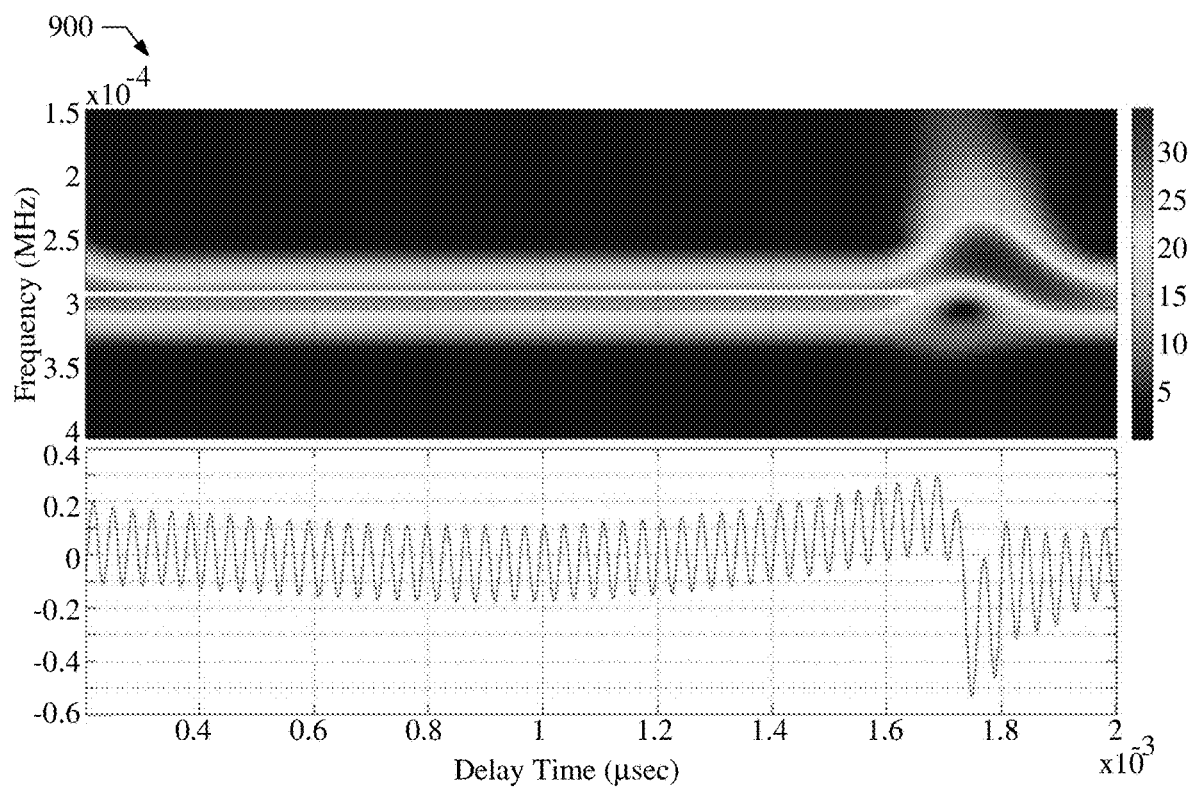
FIGS. 9 and 10 illustrate simulated frequency and amplitude spectra with respect to time produced by a sliding window Fourier transform of interference signals produced by a 5 µm thick $SiO_2$ stack on Poly/WSi, in which the acoustic wave propagates with constant and varying velocity, respectively.
Figure 10:
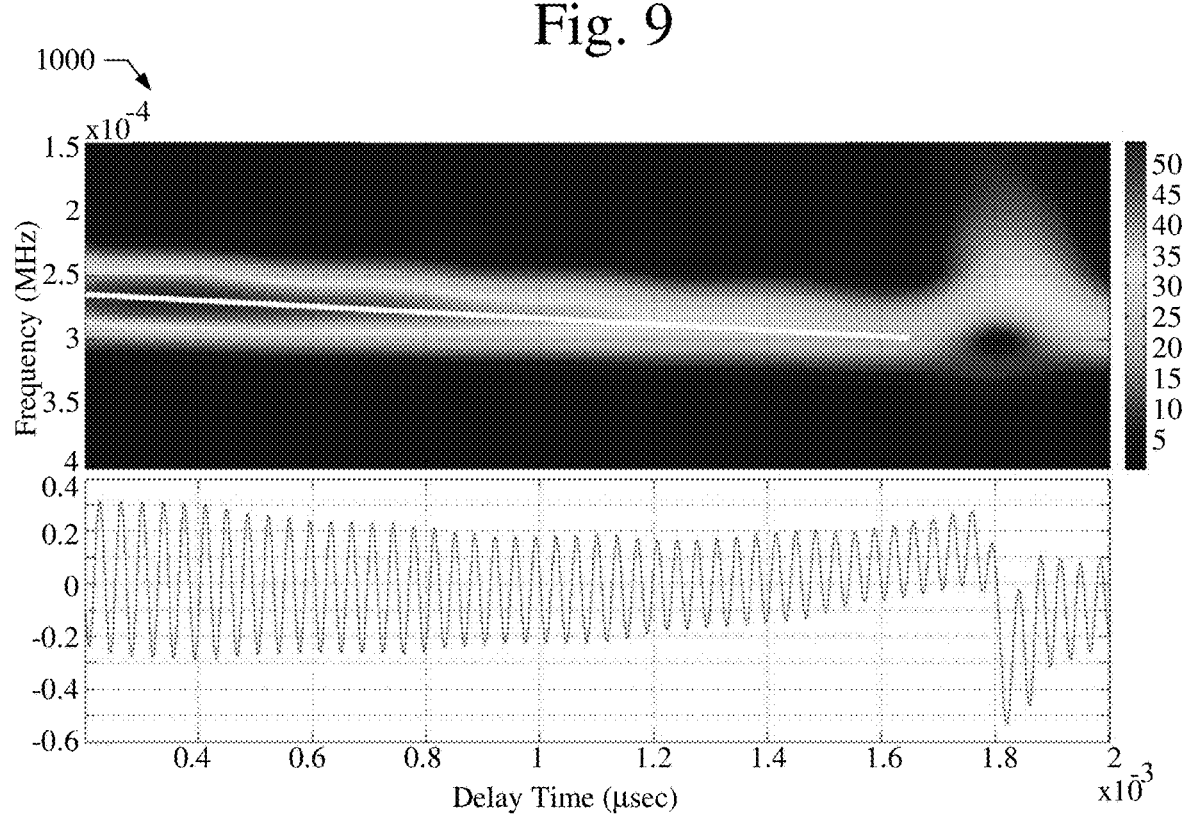

FIG. 9 and FIG. 10, by way of example, illustrate simulated frequency and amplitude spectra with respect to time (visualized as periodograms 900 and 1000) produced by a sliding window Fourier transform of a signal produced by a 5 μm thick $SiO_2$ stack on Poly/WSi, in which the acoustic wave propagates with constant velocity and depth varying velocity, respectively. The periodogram 900, shown in FIG. 9, illustrates the resulting frequency and amplitude spectra in the time domain where the acoustic wave propagates with constant velocity $V_0$, e.g., as would be the case where there are no non-uniformities. The periodogram 1000, shown in FIG. 10, illustrates the resulting frequency and amplitude spectra in the time domain where the acoustic wave propagates with a velocity that varies linearly with depth, e.g., from $0.92V_0$ to $1.0V_0$ from bottom to top of the $SiO_2$ stack.

As can be seen by visually comparing the periodograms 900 and 1000, changes in the velocity of the acoustic wave produces clear changes in the frequency (and period) of the resulting frequency and amplitude spectra that can be seen to vary with time (i.e., position in the stack). Accordingly, the frequency and amplitude spectra with respect to time may be used to identify the presence and location of non-uniformities, e.g., as discussed above. For example, changes in frequency and/or amplitude over time that exceed a threshold may identify non-uniformities. Additionally, or alternatively, the speed of sound modulus and/or modulus of elasticity may be determined and any variation greater than pre-determined threshold(s) may be used to determine the presence of a non-uniformity. By way of example, the variations of one or more of the frequency, amplitude, speed of sound modulus, and modulus of elasticity may be based on a comparison to an average value over the full time domain, or may be based on a comparison to values at adjacent (e.g., preceding and subsequent) times.

The opto-acoustic measurement of a film stack may be used to monitor material properties and/or layer thickness of the film stack, e.g., based on the speed of sound/elastic modulus deviation from normal, which is seen as frequency changes in the sliding window Fourier Transform analysis of the signal, and which has depth resolution (Z). Monitoring material properties in the film stack, for example, may potentially impact downstream processing, such as channel hole etch, rate, twist, bow, etc. Layer thickness changes may be monitored, for example, to detect O/N layer thickness changes within the film stack with depth resolution (Z), with sensitivity to thickness changes throughout the depth of film stack. Monitoring layer thickness in the film stack, for example, may potentially impact downstream processes such as Nitride removal, where a thinner N layer may result in incomplete removal, or Tungsten fill, where an incomplete Nitride clear or a gap that is too thin may affect fill and lead to voiding. Monitoring layer thickness in the film stack may potentially impact device performance, such as identification of gate width (N) and/or gate spacing (O) deviation from specification.

Figure 11:
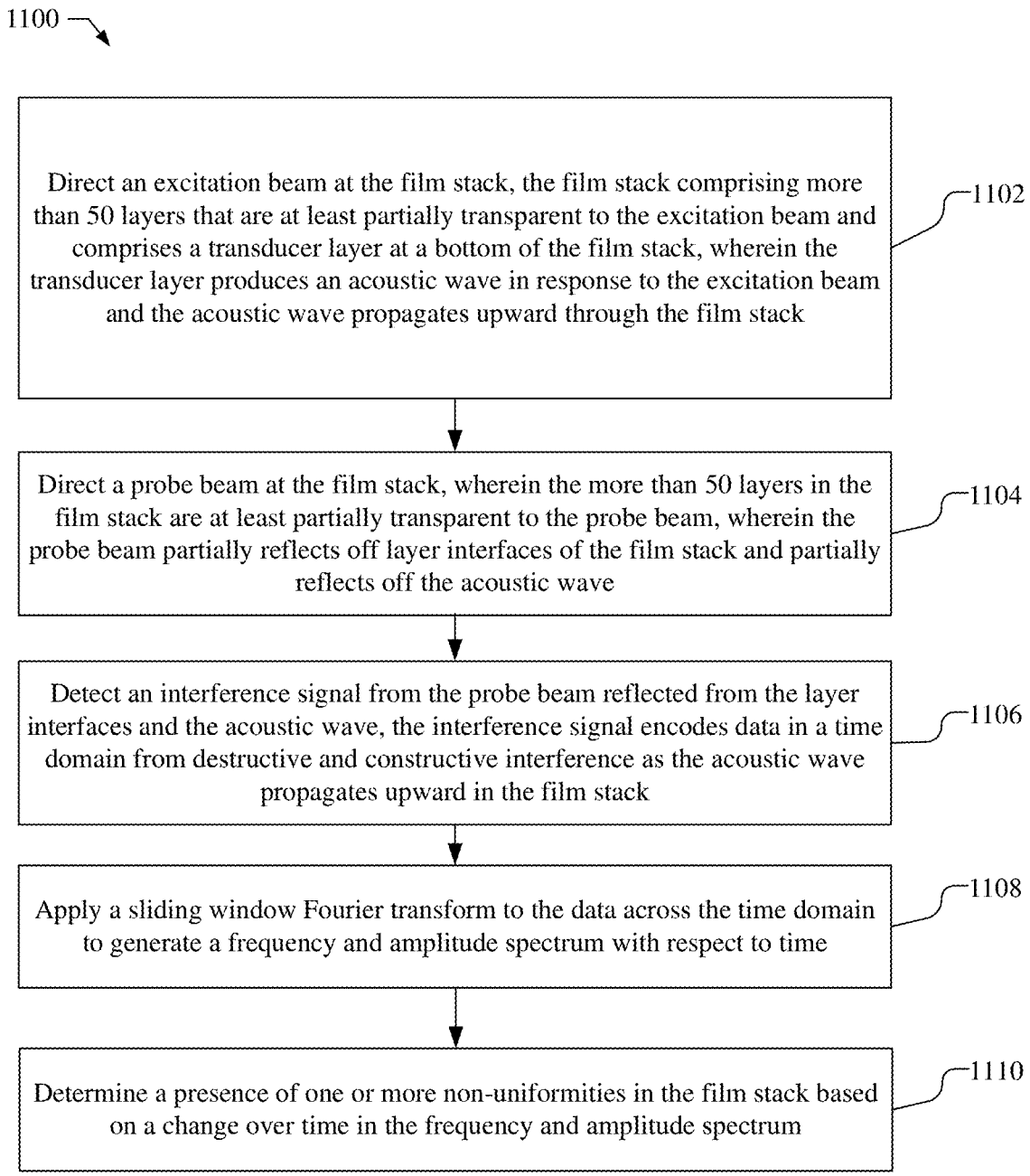
FIG. 11 is a flow chart illustrating a method of non-destructive acoustic metrology of a film stack on a sample.

FIG. 11 is a flow chart 1100 illustrating a method of non-destructive acoustic metrology of a film stack on a sample. As illustrated, the method includes directing an excitation beam at the film stack, the film stack comprising more than 50 layers that are at least partially transparent to the excitation beam and comprises a transducer layer at a bottom of the film stack, wherein the transducer layer produces an acoustic wave in response to the excitation beam and the acoustic wave propagates upward through the film stack (1102), for example, as discussed in FIGS. 2, 3, and 4A and 4B. A means for directing an excitation beam at the film stack, the film stack comprising more than 50 layers that are at least partially transparent to the excitation beam and comprises a transducer layer at a bottom of the film stack, wherein the transducer layer produces an acoustic wave in response to the excitation beam and the acoustic wave propagates upward through the film stack may include, e.g., the pump laser 220 shown in FIG. 2, or the laser and components for the pump beam of the opto-acoustic metrology system 300 shown in FIG. 3.

A probe beam is directed at the film stack, wherein the more than 50 layers in the film stack are at least partially transparent to the probe beam, wherein the probe beam partially reflects off layer interfaces of the film stack and partially reflects off the acoustic wave (1104), for example, as discussed in FIGS. 2, 3, and 4A and 4B. The layer interfaces of the film stack, for example, include the top surface and underlying layer interfaces within the film stack. The probe beam, for example, may have a wavelength that is greater than a thickness of each layer in the film stack. A means for directing a probe beam at the film stack, wherein the more than 50 layers in the film stack are at least partially transparent to the probe beam, wherein the probe beam partially reflects off the layer interfaces of the film stack and partially reflects off the acoustic wave may be, e.g., the probe laser 222 shown in FIG. 2, or the laser and components for the probe beam of the opto-acoustic metrology system 300 shown in FIG. 3.

An interference signal is detected from the probe beam reflected from the layer interfaces and the acoustic wave, the interference signal encodes data in a time domain from destructive and constructive interference as the acoustic wave propagates upward in the film stack (1106), for example, as discussed in FIGS. 4A, 4B, 6A, 6B, 7A, 7B, and 8-10. A means for detecting an interference signal from the probe beam reflected from the layer interfaces and the acoustic wave, the interference signal encodes data in a time domain from destructive and constructive interference as the acoustic wave propagates upward in the film stack may be, e.g., the sensor 228 shown in FIG. 2 or the detector D1 of the opto-acoustic metrology system 300 shown in FIG. 3.

A sliding window Fourier transform is applied to the data across the time domain to generate a frequency and amplitude spectrum with respect to time (1108), for example, as discussed in FIGS. 7A, 7B, and 8. For example, the sliding window Fourier transform may have a length greater than 2 interference oscillations and less than 10 interference oscillations. A means for applying a sliding window Fourier transform to the data across the time domain to generate a frequency and amplitude spectrum with respect to time may be, e.g., controller 230 shown in FIG. 2 or the processor 330 of the opto-acoustic metrology system 300 shown in FIG. 3.

A presence of one or more non-uniformities in the film stack is determined based on a change over time in the frequency and amplitude spectrum (1110), for example, as discussed in FIG. 8. A means for determining a presence of one or more non-uniformities in the film stack based on a change over time in the frequency and amplitude spectrum may be, e.g., controller 230 shown in FIG. 2 or the processor 330 of the opto-acoustic metrology system 300 shown in FIG. 3.

For example, the presence of non-uniformities in the film stack may be determined based on a change in one of the frequency or amplitude varies by an amount greater than a threshold, e.g., as illustrated in FIGS. 8 and 10. For example, the variation of the frequency or amplitude may be determined over time, e.g., to determine the position in the film stack that corresponds to the variation.

In another example, the frequency and amplitude spectrum may be converted to a speed of sound modulus, and the presence of one or more non-uniformities may be identified by determining that the speed of sound modulus varies by an amount greater than a threshold, e.g., as discussed in reference to FIG. 8. For example, the variation of the speed of sound modulus may be determined over time, e.g., to determine the position in the film stack that corresponds to the variation.

The frequency in the frequency and amplitude spectrum with respect to time may encode information related to a depth resolved elastic modulus of the film stack. The presence of non-uniformities in the film stack may be determined by converting the frequency and amplitude spectrum to the elastic modulus; and determining the elastic modulus varies by an amount greater than a threshold determining changes in the elastic modulus of the film stack, e.g., as discussed in reference to FIG. 8.

The frequency in the frequency and amplitude spectrum with respect to time may encode information related to a depth resolved constituent layer thickness of the film stack. The presence of non-uniformities in the film stack may be determined by converting the frequency and amplitude spectrum to the layer thickness and determining the layer thickness varies by an amount greater than a threshold, e.g., as discussed in reference to FIG. 8.

The time domain of the interference signal encodes depth information for the film stack, and the presence of non-uniformities in the film stack is determined based on a change over time in the frequency and amplitude spectrum includes determining a depth in the film stack of non-uniformities, e.g., by converting the time of a change in the frequency and amplitude spectrum to the depth in the film stack, e.g., as discussed in FIG. 8.

In one implementation, a model for one or more characteristics of the film stack may be generated, and the one or more non-uniformities in the film stack may be determined based on the model and the change over time in the frequency and amplitude spectrum, e.g., as discussed in reference to FIG. 8.

The transducer at the bottom of the film stack may be configured to generate an acoustic wave that has a desired acoustic profile in response to the excitation beam and the characteristics of the film stack.

Figure 12:
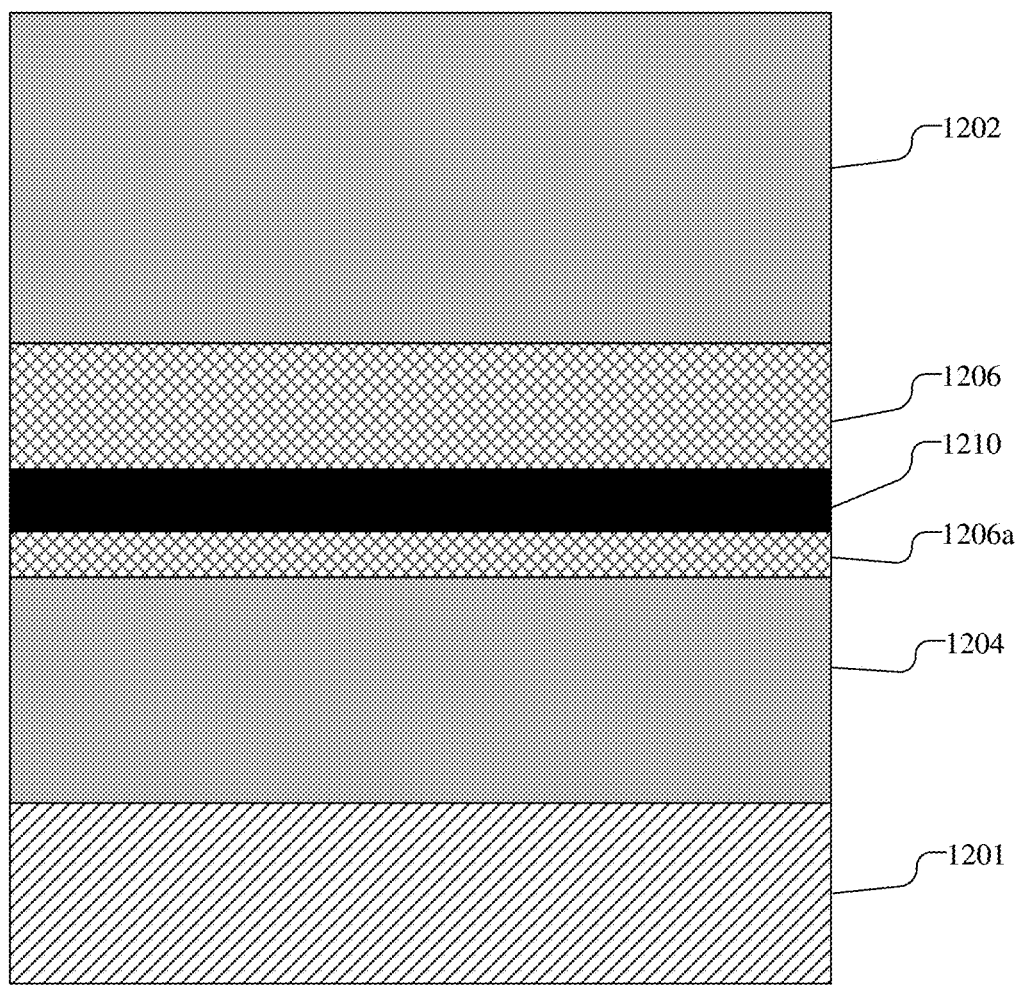
FIG. 12 illustrates a side view of model stack used to simulate propagating strain profile produced at a transducer layer.

FIG. 12 illustrates, for example, a side view of an example of a model stack 1200 used to simulate propagating strain profile produced at a transducer layer 1210. The stack 1200 includes a silicon substrate 1201, and a thick $SiO_2$ layer 1202 as the top film. The model provides the temporal profile of the relative strain induced within the top $SiO_2$ film at a distance 15,000 Å from the lower interface. A relatively thick, e.g., 80,000 Å, $SiO_2$ layer 1204 below the transducer layer 1210 prevents a return of signals from below the transducer layer 1210 that are outside the window of interest. A polysilicon layer 1206, which may be e.g., 5000 Å, is illustrated above the transducer layer 1210, but may be below the transducer layer 1210 as well, e.g., between the transducer layer 1210 and the $SiO_2$ layer 1204 (e.g., as illustrated by layer 1206*a*) or in place of the $SiO_2$ layer 1204. The transducer layer 1210 may be a metal such as Tungsten (W), Tungsten Silicide (WSix), or WPlug. The WPlug, for example, is a plurality of Tungsten vias in a $SiO_2$ layer, which may be approximated as an effective medium approximation (EMA) for 50% dense W via array.

Figure 13:
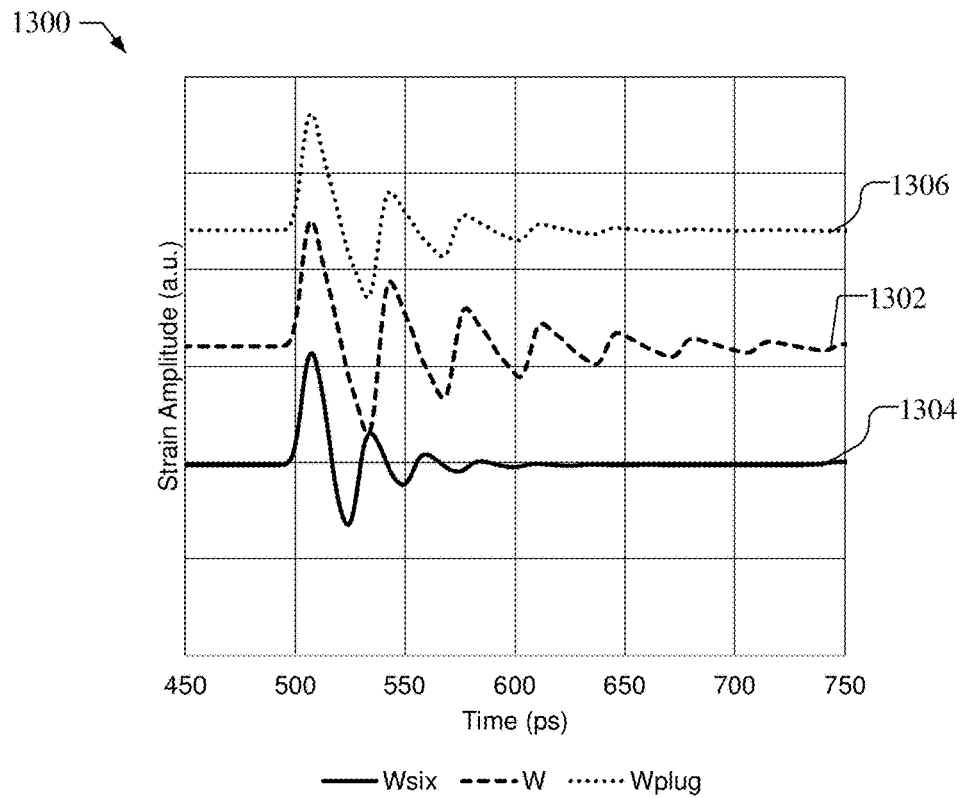
FIGS. 13-16 illustrate a simulated propagating strain profiles for various different layer parameters in the model stack.

FIGS. 13-16 are graphs illustrating simulated propagating strain profiles, with time (ps) along the X axis and strain amplitude along the Y axis of the graph, produced by a transducer layer 1210 for various configurations of the layers in the stack 1200. Individual strain profiles are vertically offset from one another in the graphs shown in FIGS. 13-16 for ease of viewing. FIG. 13, for example, illustrates a graph 1300 showing the temporal strain profiles (illustrated by curves 1302, 1304, 1306) resulting from transducers 1210 produced using different materials, W, WSix or WPlug, respectively. For each case, the transducer thickness is 900 Å. No polysilicon layer 1206 or 1206a is included above or below the transducer 1210. FIG. 13 illustrates the impact of transducer material on the period and damping rate of transducer ringing.

Figure 14:
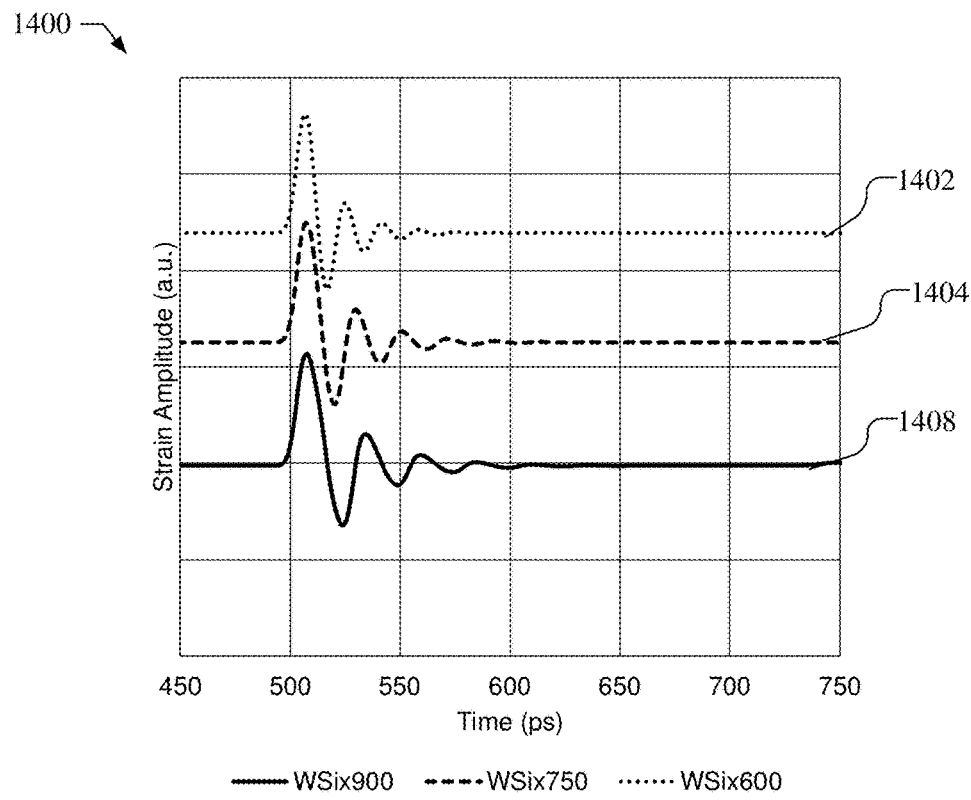

FIG. 14 illustrates a graph 1400 showing the effect of transducer thickness on the temporal strain profile. Curves 1402, 1404, 1406 show the strain profiles produced by a WSix transducer of thickness 600 Å, 750 Å or 900 Å, respectively. FIG. 14 shows that the oscillation period is directly proportional to the transducer thickness. Accordingly, by selecting the thickness of the transducer 1210, one may tune the period of oscillation. However, the damping rate of oscillations is unaffected by the transducer thickness. Although graph 1400 of FIG. 14 is specific to WSix transducer, the behaviors of oscillation period and damping rate with transducer thickness generally apply to any transducer material choice.

Figure 15:
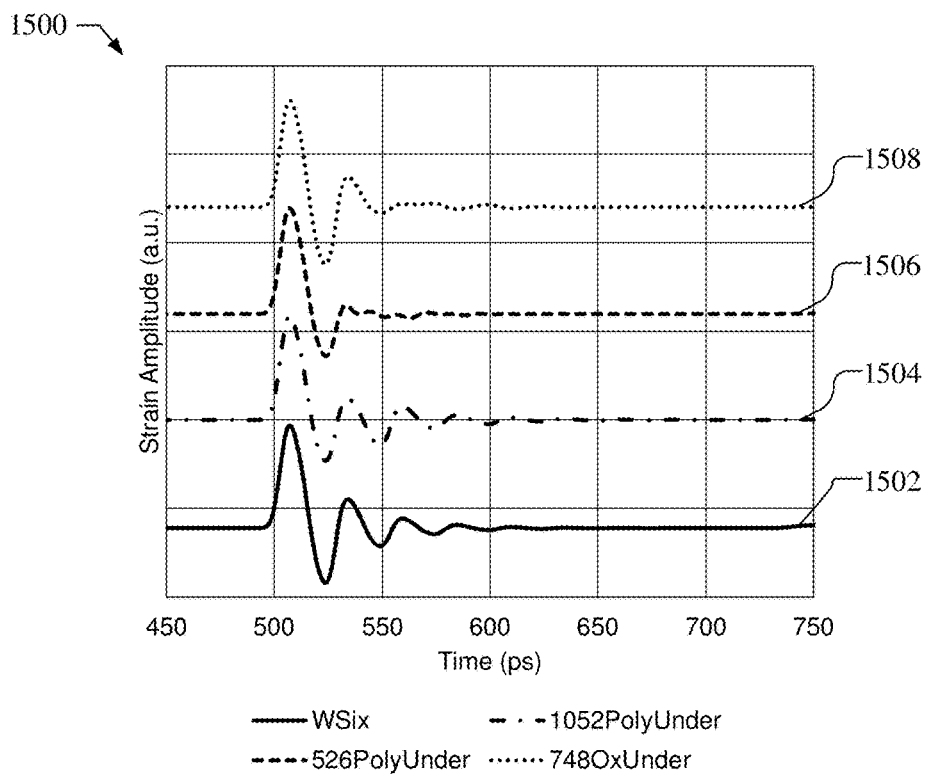

FIG. 15 illustrates a graph 1500 showing the resulting temporal strain profile produced for different configurations of layers beneath a 900 Å WSix transducer layer 1210. Curve 1502 shows a temporal strain profile for the case of thick (e.g., 80,000 Å) $SiO_2$ layer 1204 beneath transducer layer 1210. Curves 1504 and 1506 show temporal strain profile when a polysilicon layer is inserted in the stack below the transducer layer 1210. Curve 1504 corresponds to a 1052 Å polysilicon layer 1206a, while curve 1506 corresponds to a 526 Å polysilicon layer 1206a beneath transducer layer 1210. Curve 1508 shows temporal strain profile when the stack beneath transducer layer 1210 is comprised of 748 Å $SiO_2$ layer 1204 on the silicon substrate 1201. FIG. 15 illustrates the ability to affect the damping rate of oscillations by proper choice of stack configuration beneath the transducer layer 1210. Comparison of curves 1502, 1504 and 1506 shows oscillation damping may be modulated by insertion of a polysilicon layer 1206a of appropriate thickness between transducer 1210 and thick $SiO_2$ layer 1204 under transducer 1210. Polysilicon thickness of 526 Å provides optimal oscillation damping for the 900 Å WSix transducer 1210. Curve 1508 shows simple optimization of the $SiO_2$ layer 1204 thickness beneath transducer 1210 (with no polysilicon layer 1206a insertion) may also enhance damping of oscillations. Both thickness and acoustic impedance of the layer beneath transducer layer 1210 affect the damping rate of oscillations.

Figure 16:
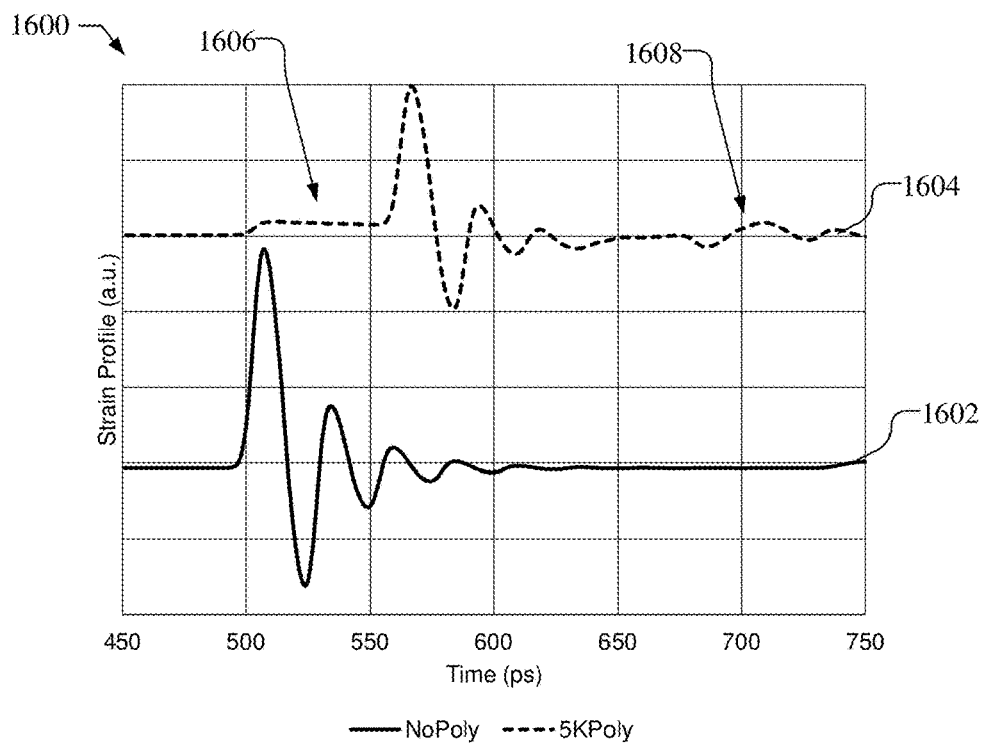

FIG. 16 illustrates a graph 1600 showing modulation of temporal strain profile by the presence of a polysilicon layer 1206 above transducer layer 1210. Curve 1602 shows a temporal strain profile for a stack 1200 comprised of 900 Å WSix transducer layer 1210 with no polysilicon layer 1206 above. Curve 1604 shows a temporal strain profile for the same stack 1200 with 5000 Å polysilicon layer 1206 included above the transducer 1210. As seen at areas 1606 and 1608, the use of a 5000 Å polysilicon layer 1206 results in a small "pre" strain profile that is broad and secondary echoes that are weak, e.g., approximately 10% level. Comparison of curve 1604 with curve 1602 also shows the use of 5000 Å polysilicon layer 1206 results in slight increase in damping rate of the oscillations following an initial strain response.

Figure 17:
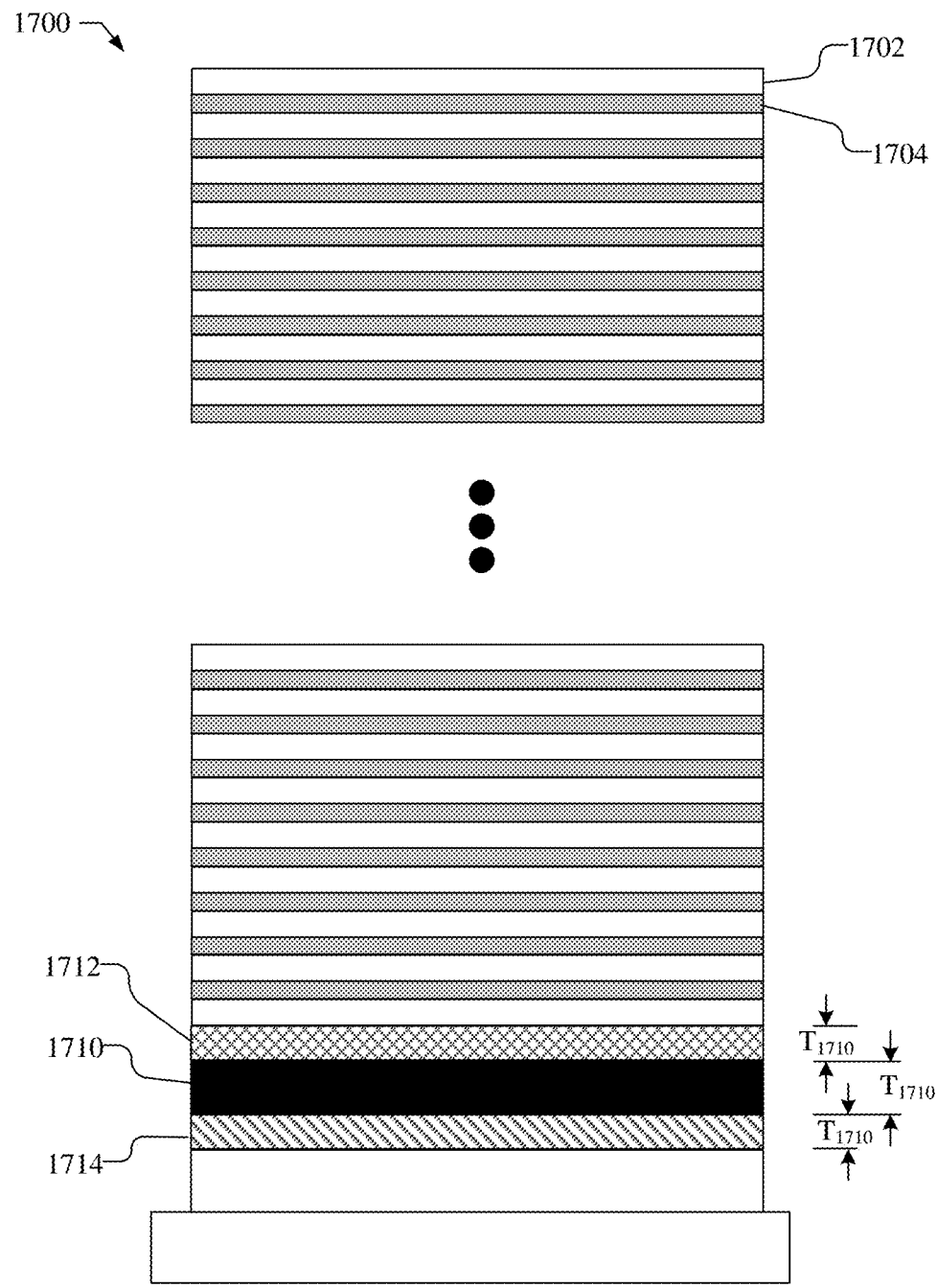
FIG. 17 illustrates a side view of an acoustic metrology target with a film stack including a transducer that is configured to generate an acoustic wave with a desired acoustic profile in response to the excitation beam and the characteristics of the film stack.

FIG. 17 illustrates a side view of an example of an acoustic metrology target with a film stack 1700, e.g., similar to that shown in FIG. 1, but with a transducer that is configured to generate an acoustic wave that has a desired acoustic profile in response to the excitation beam and the characteristics of the film stack. The film stack 1700, for example, may be part of a functioning device, e.g., a 3D-NAND device structure, or may be a metrology target designed for measuring corresponding devices on the sample, e.g. is produced along with and is the same as the functioning device under test, except for the configured transducer.

Film stack 1700, for example, includes a large number of stacked layers 1702 and 1704, e.g., 50 layers or more. At the base of the film stack 1700 is the transducer layer 1710 which has a thickness of $T_{1810}$. In some implementations, the transducer layer 1710 may include multiple materials, e.g., in a via matrix with a desired density. The thickness and composition of the transducer layer 1710 may be selected to achieve a desired acoustic profile in the stacked layers 1702 and 1704 in response to an excitation beam. In some implementations, the transducer layer 1710 may include a composition, density, and pattern of an array of vias, e.g., which may be non-uniform, to achieve a desired acoustic profile. As illustrated, above and below the transducer layer 1710 are layers 1712 and 1714, having thicknesses $T_{1812}$ and $T_{1814}$, respectively. The layers 1712 and 1714, for example, may be $SiO_2$ and/or polysilicon. The presence, thicknesses, and compositions of the layers 1712 and 1714 may be selected to achiever a desired acoustic profile in the stacked layers 1702 and 1704 in response to an excitation beam.

The materials selected for the base of the film stack 1700, including the transducer layer 1710 and one or more of layers 1712 and 1714 are consistent with the fabrication process of the device under test, e.g., a V-NAND process. The materials and thickness of the transducer layer 1710, for example, must be selected so that performs as an acoustic transducer in response to the excitation beam, e.g., the transducer layer absorbs the excitation beam and produces an acoustic wave in response. For example, the transducer layer 1710 may include metal, such as W, WSix, WPlug, or a polysilicon. The transducer layer 1710 may include vias, such as W vias having a selected density and configuration in a $SiO_2$ layer. The transducer layer 1710 may have a material and/or thickness so that it is opaque to the excitation beam. A strong excitation beam absorption, for example, is preferred as it generally produces a stronger acoustic signal. Moreover, probe beam penetration beyond the transducer layer 1710 is undesirable, as it complicates the signal analysis. Accordingly, the wavelengths of the excitation and probe beams may define the materials and minimum thickness of the transducer layer 1710. For example, polysilicon is generally a weak acoustic transducer layer for wavelengths greater than 500 nm. Because the excitation beam should reach the transducer layer 1710, the layer 1712 above the transducer layer 1710, if present, should be at least partially transparent to the excitation beam.

The materials and thicknesses of the transducer layer 1710, and layers 1712 and 1714 may be selected to achieve a desired acoustic profile, such as damping of ringing. For example, to achieve the best temporal resolution, which is equivalent to vertical position of the film stack, minimal ringing is desirable. The use of WSix, as opposed to W, in the transducer layer 1710 may reduce the acoustic impedance mismatch with materials to which the transducer layer 1710 is adjacent. Thus, the transducer layer 1710 may be configured to match an acoustic impedance of a layer in the film stack in which the transducer layer is in contact to reducing ringing of the transducer layer.

Moreover, by tailoring the thicknesses of the layers 1712 and/or 1714, i.e., above and/or below the transducer layer 1710, ringing may be reduced, e.g., as illustrated with SiO2 and polysilicon layers of appropriate thickness in FIGS. 15 and 16. Thus, at least one layer above and/or below the transducer layer 1710, e.g., layers 1712 and 1714 may be configured with a thickness that reduces acoustic ringing in the transducer layer. Additionally, the period of ringing may be controlled by proper selection of the materials and thicknesses of the transducer layer 1710, and layers 1712 and 1714. For example, to the extent the acoustic profile exhibits ringing, the period of ringing should be resonant with the characteristic period of film stack signal. The period of ringing may be defined by an optimal thickness window for the transducer layer 1710, which should be consistent with the minimum thickness defined by opacity requirement. Thus, the transducer layer 1710 may be configured with a thickness that produces ringing with a period that is resonant with a characteristic period of the film stack.

FIG. 18 is a flow chart 1800 illustrating a method of generating an acoustic metrology target for a film stack on a sample. As illustrated, the method includes selecting a configuration of a transducer layer at a bottom of the film stack comprising a plurality of film layers that are at least partially transparent to an excitation beam and a probe beam from an acoustic metrology device, wherein the transducer layer is configured to be opaque to the excitation beam and to produce an acoustic wave that propagates through the film stack in response to the excitation beam, wherein the configuration of the transducer layer is selected to generate an acoustic profile that is based on characteristics of the film stack (1802). The method may further include selecting a configuration of at least one layer above or below the transducer layer, wherein the at least one layer is configured to reduce acoustic ringing in the transducer layer (1804).

For example, the materials of the transducer layer may be configured to match an acoustic impedance of a layer in the film stack in which the transducer layer is in contact to reducing ringing of the transducer layer. The thickness of the transducer layer may be configured to produce ringing with a period that is resonant with a characteristic period of the film stack. The transducer layer may be configured with an array of vias to generate the acoustic profile based on the characteristics of the film stack. A thickness of the at least one layer may be configured to reduce acoustic ringing in the transducer layer.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method of non-destructive acoustic metrology of a film stack on a sample, the method comprising:
    directing an excitation beam at the film stack, the film stack comprising a plurality of layers that are at least partially transparent to the excitation beam and comprises a transducer layer at a bottom of the film stack, wherein the transducer layer produces an acoustic wave in response to the excitation beam and the acoustic wave propagates upward through the film stack;
    directing a probe beam at the film stack, wherein the plurality of layers in the film stack are at least partially transparent to the probe beam, wherein the probe beam partially reflects off layer interfaces of the film stack and partially reflects off the acoustic wave;
    detecting an interference signal from the probe beam reflected from the layer interfaces and the acoustic wave, the interference signal encodes data in a time domain from destructive and constructive interference as the acoustic wave propagates upward in the film stack;
    transforming the data across the time domain with a sliding window transform to generate a frequency and amplitude spectrum with respect to time; and
    determining a presence of one or more non-uniformities in the film stack based on a change over time in the frequency and amplitude spectrum.

2. The method of claim 1, wherein the presence of non-uniformities in the film stack is determined based on a change in one of the frequency or amplitude varies by an amount greater than a threshold.

3. The method of claim 1, determining the presence of non-uniformities in the film stack based on the change over time in the frequency and amplitude spectrum comprises:
    converting the frequency and amplitude spectrum to a speed of sound modulus; and
    determining the speed of sound modulus varies by an amount greater than a threshold.

4. The method of claim 1, wherein a frequency in the frequency and amplitude spectrum with respect to time encodes information related to a depth resolved elastic modulus of the film stack and determining the presence of non-uniformities in the film stack based on the change over time in the frequency and amplitude spectrum comprises:
    converting the frequency and amplitude spectrum to the elastic modulus; and
    determining the elastic modulus varies by an amount greater than a threshold.

5. The method of claim 1, wherein a frequency in the frequency and amplitude spectrum with respect to time encodes information related to a depth resolved layer thickness of the film stack and determining the presence of non-uniformities in the film stack based on the change over time in the frequency and amplitude spectrum comprises:
    converting the frequency and amplitude spectrum to the layer thickness; and
    determining the layer thickness varies by an amount greater than a threshold.

6. The method of claim 1, wherein the time domain encodes depth information for the film stack, and determining the presence of non-uniformities in the film stack based on a change over time in the frequency and amplitude spectrum comprises determining a depth of the non-uniformities in the film stack.

7. The method of claim 1, wherein transforming the data across the time domain with the sliding window transform comprises applying a sliding window Fourier transform that has a length greater than 2 interference oscillations and less than 10 interference oscillations.

8. The method of claim 1, wherein the probe beam has a wavelength that is greater than a thickness of each layer in the film stack.

9. The method of claim 1, further comprising:
    generating a model for one or more characteristics of the film stack; and
    determining the one or more non-uniformities in the film stack based on the model and the change over time in the frequency and amplitude spectrum.

10. A metrology device for non-destructive acoustic metrology of a film stack on a sample, comprising:
- an excitation beam source configured to generate an excitation beam directed at the film stack, the film stack comprising a plurality of layers that are at least partially transparent to the excitation beam and comprises a transducer layer at a bottom of the film stack, wherein the transducer layer produces an acoustic wave in response to the excitation beam and the acoustic wave propagates upward through the film stack;
- a probe beam source configured to generate a probe beam directed at the film stack, wherein the plurality of layers in the film stack are at least partially transparent to the probe beam, wherein the probe beam partially reflects off layer interfaces of the film stack and partially reflects off the acoustic wave;
- an optical sensor configured detect an interference signal from the probe beam reflected from the layer interfaces and the acoustic wave, the interference signal encodes data in a time domain from destructive and constructive interference as the acoustic wave propagates upward in the film stack;
- at least one processor coupled to receive the interference signal from the optical sensor and configured to:
  - transform the time domain with a sliding window transform to generate a frequency and amplitude spectrum with respect to time; and
  - determine a presence of one or more non-uniformities in the film stack based on a change over time in the frequency and amplitude spectrum.

11. The metrology device of claim 10, wherein the presence of non-uniformities in the film stack is determined based on a change in one of the frequency or amplitude varies by an amount greater than a threshold.

12. The metrology device of claim 10, wherein the at least one processor is configured to determine the presence of non-uniformities in the film stack based on the change over time in the frequency and amplitude spectrum by being configured to:
- convert the frequency and amplitude spectrum to a speed of sound modulus; and
- determine the speed of sound modulus varies by an amount greater than a threshold.

13. The metrology device of claim 10, wherein a frequency in the frequency and amplitude spectrum with respect to time encodes information related to a depth resolved elastic modulus of the film stack and wherein the at least one processor is configured to determine the presence of non-uniformities in the film stack based on the change over time in the frequency and amplitude spectrum by being configured to:
- convert the frequency and amplitude spectrum to the elastic modulus; and
- determine the elastic modulus varies by an amount greater than a threshold.

14. The metrology device of claim 10, wherein a frequency in the frequency and amplitude spectrum with respect to time encodes information related to a depth resolved layer thickness of the film stack and wherein the at least one processor is configured to determine the presence of non-uniformities in the film stack based on the change over time in the frequency and amplitude spectrum by being configured to:
- convert the frequency and amplitude spectrum to the layer thickness; and
- determine the layer thickness varies by an amount greater than a threshold.

15. The metrology device of claim 10, wherein the time domain encodes depth information for the film stack, and wherein the at least one processor is configured to determine the presence of non-uniformities in the film stack based on the change over time in the frequency and amplitude spectrum by being configured to determine a depth of the non-uniformities in the film stack.

16. A wafer comprising an acoustic metrology target for a film stack under test, the acoustic metrology target comprising:
- the film stack comprising a plurality of film layers that are at least partially transparent to an excitation beam and a probe beam from an acoustic metrology device; and
- a transducer layer at a bottom of the film stack, wherein the transducer layer is configured to be opaque to the excitation beam and to produce an acoustic wave that propagates through the film stack in response to the excitation beam, wherein the transducer layer is configured to generate an acoustic profile based on characteristics of the film stack.

17. The wafer of claim 16, wherein the transducer layer is configured to generate the acoustic profile based on the characteristics of the film stack by being configured to match an acoustic impedance of a layer in the film stack in which the transducer layer is in contact to reducing ringing of the transducer layer.

18. The wafer of claim 16, wherein the transducer layer is configured to generate the acoustic profile based on the characteristics of the film stack by being configured with a thickness that produces ringing with a period that is resonant with a characteristic period of the film stack.

19. The wafer of claim 16, wherein the transducer layer is configured to generate the acoustic profile based on the characteristics of the film stack by being configured as a non-uniform array of vias.

20. The wafer of claim 16, wherein the transducer layer is configured to generate the acoustic profile based on the characteristics of the film stack by being configured with at least one layer above or below the transducer layer, wherein the at least one layer is configured with a thickness configured to reduce acoustic ringing in the transducer layer.

* * * * *